(12) United States Patent
Lin et al.

(10) Patent No.: US 11,431,977 B2
(45) Date of Patent: Aug. 30, 2022

(54) IMAGE CODING METHOD AND APPARATUS, AND IMAGE DECODING METHOD AND APPARATUS

(71) Applicants: TONGJI UNIVERSITY, Shanghai (CN); XIAN ZHONGXING NEW SOFTWARE CO., LTD, Shaanxi (CN)

(72) Inventors: Tao Lin, Shanghai (CN); Ming Li, Shenzhen (CN); Guoqiang Shang, Shenzhen (CN); Zhao Wu, Shenzhen (CN)

(73) Assignees: XI'AN ZHONGXING NEW SOFTWARE CO., LTD, Shaanxi (CN); TONGJI UNIVERSITY, Shanghai (CN)

( * ) Notice: Subject to any disclaimer, the term of this patent is extended or adjusted under 35 U.S.C. 154(b) by 245 days.

(21) Appl. No.: 16/927,093

(22) Filed: Jul. 13, 2020

(65) Prior Publication Data

US 2020/0344479 A1    Oct. 29, 2020

Related U.S. Application Data

(62) Division of application No. 15/549,408, filed as application No. PCT/CN2016/073603 on Feb. 5, 2016, now Pat. No. 10,750,180.

(30) Foreign Application Priority Data

Feb. 8, 2015   (CN) .......................... 201510063069.3
Feb. 3, 2016   (CN) .......................... 201610079054.0

(51) Int. Cl.
*H04N 19/129*    (2014.01)
*H04N 19/593*    (2014.01)
(Continued)

(52) U.S. Cl.
CPC .......... *H04N 19/129* (2014.11); *H04N 19/14* (2014.11); *H04N 19/176* (2014.11);
(Continued)

(58) Field of Classification Search
CPC ...... G06T 9/004; H04N 19/593; H04N 19/44; H04N 19/182; H04N 19/176; H04N 19/14; H04N 19/129
See application file for complete search history.

(56) References Cited

U.S. PATENT DOCUMENTS 9,277,215 B2    3/2016   Zheng
9,357,212 B2    5/2016   Zhang
(Continued)

FOREIGN PATENT DOCUMENTS

CN    1665301 A    9/2005
CN    1829329 A    9/2006
(Continued)

OTHER PUBLICATIONS

C-C Chen, "CE3: Summary report for Core Experiment 3 on Intra Line Copy and Intra String Copy", JCT-VC Meeting, Feb. 10, 2015, XP030117138.
(Continued)

*Primary Examiner* — Mia M Thomas
(74) *Attorney, Agent, or Firm* — Cantor Colburn LLP

(57) ABSTRACT

An image coding method and apparatus, and an image decoding method and apparatus are provided. In the coding method, a scanning manner parameter of a coding block is determined, and the scanning manner parameter may include at least one of: a region indication parameter used for determining a scanning region of the coding block and a scanning indication parameter used for determining a scanning order of pixels in a scanning region of the coding block; predicted values of part or all of pixels in the coding block
(Continued)

are determined according to the scanning manner parameter; and the coding block is coded according to the predicted values, and a coding result is written into a bitstream.

20 Claims, 5 Drawing Sheets

(51) Int. Cl.
  *H04N 19/14* (2014.01)
  *H04N 19/182* (2014.01)
  *H04N 19/176* (2014.01)
  *H04N 19/44* (2014.01)
  *G06T 9/00* (2006.01)

(52) U.S. Cl.
  CPC ........... *H04N 19/182* (2014.11); *H04N 19/44* (2014.11); *H04N 19/593* (2014.11); *G06T 9/004* (2013.01)

(56) References Cited

U.S. PATENT DOCUMENTS

| | | | |
|---|---|---|---|
| 9,426,491 B2* | 8/2016 | Kim | H04N 19/593 |
| 9,591,325 B2 | 3/2017 | Li | |
| 9,749,646 B2 | 8/2017 | Zhu | |
| 9,936,204 B1 | 4/2018 | Sim | |
| 10,038,920 B2 | 7/2018 | Helle | |
| 10,110,903 B2 | 10/2018 | Wiegand | |
| 10,560,712 B2 | 2/2020 | Zou | |
| 10,575,022 B2 | 2/2020 | Lin | |
| 2008/0131014 A1 | 6/2008 | Lee | |
| 2011/0110416 A1 | 5/2011 | Lawrence | |
| 2013/0121415 A1 | 5/2013 | Wahadaniah | |
| 2014/0086313 A1 | 3/2014 | Zheng | |
| 2014/0105283 A1 | 4/2014 | Li | |
| 2014/0169474 A1 | 6/2014 | Kang | |
| 2014/0286402 A1 | 9/2014 | Nishitani | |
| 2014/0286403 A1 | 9/2014 | Nishitani | |
| 2014/0376621 A1 | 12/2014 | Fukushima | |
| 2015/0016501 A1 | 1/2015 | Guo | |
| 2015/0023405 A1 | 1/2015 | Joshi | |
| 2015/0030066 A1 | 1/2015 | Xu | |
| 2015/0208084 A1 | 7/2015 | Zhu | |
| 2016/0037164 A1* | 2/2016 | Joshi | H04N 19/44 375/240.02 |
| 2016/0057430 A1 | 2/2016 | Kolesnikov | |
| 2016/0150230 A1 | 5/2016 | He | |
| 2016/0277666 A1 | 9/2016 | Shoda | |
| 2016/0330455 A1 | 11/2016 | Lin | |
| 2016/0366439 A1* | 12/2016 | Pu | H04N 19/93 |
| 2017/0013261 A1 | 1/2017 | Lin | |
| 2017/0064330 A1* | 3/2017 | Li | H04N 19/90 |
| 2017/0230685 A1 | 8/2017 | Gisquet | |
| 2017/0318302 A1* | 11/2017 | Ye | H04N 19/70 |
| 2018/0027235 A1* | 1/2018 | Lin | H04N 19/593 382/233 |
| 2018/0035132 A1 | 2/2018 | Lin | |
| 2018/0262762 A1 | 9/2018 | Sim | |
| 2018/0332292 A1* | 11/2018 | Lin | H04N 19/11 |
| 2019/0087945 A1* | 3/2019 | Lee | H04N 19/46 |
| 2019/0089962 A1 | 3/2019 | Winken | |
| 2019/0116380 A1 | 4/2019 | Chuang | |
| 2019/0182482 A1* | 6/2019 | Vanam | H04N 19/132 |
| 2020/0279130 A1* | 9/2020 | Vosoughi | G06T 9/00 |
| 2021/0152821 A1* | 5/2021 | Ikonin | H04N 19/80 |
| 2021/0211657 A1* | 7/2021 | Ikonin | H04N 19/80 |
| 2022/0116597 A1* | 4/2022 | Ikonin | H04N 19/117 |

FOREIGN PATENT DOCUMENTS

| | | |
|---|---|---|
| CN | 101389021 A | 3/2009 |
| CN | 102595113 A | 7/2012 |
| CN | 104081774 A | 10/2014 |
| CN | 104244007 A | 12/2014 |
| EP | 2306732 A1 | 4/2011 |
| GB | 2521117 A | 6/2015 |
| WO | 2008020672 A1 | 2/2008 |

OTHER PUBLICATIONS

European Search Report for corresponding application EP 16 74 6149; Report dated Jan. 23, 2018.
International Search Report for corresponding application PCT/CN2016/073603 filed on Feb. 5, 2016: dated Mar. 29, 2016.
Kobayashi Masa Aki, "Lossless Compression for Compound Color Document Images", Jan. 1, 2001, pp. 1525-1528, XP007015578.
Maani E., "Differential coding of intra modes (DCIM)", Joint Collaborative Team, Jul. 24, 2010, XP030007688.

* cited by examiner

Four different kinds of mixed-direction mixed-shape 2-split scanning

Coding block    Coding block    Coding block    Coding block

IMAGE CODING METHOD AND APPARATUS, AND IMAGE DECODING METHOD AND APPARATUS

TECHNICAL FIELD

The present disclosure relates to the field of communications, and particularly to an image (or picture) coding method and apparatus, and an image (or picture) decoding method and apparatus.

BACKGROUND

Along with development of resolutions of televisions and displays into ultra high definition (4K) and extra ultra high definition (8K) and development and popularization of a new-generation cloud computing and information processing mode and platform adopting a remote desktop as a typical representation form, there is a requirement for applying video image data compression to a higher-resolution composite image including a computer screen image and an image shot by a camera. An ultra high compression rate and extremely high-quality data compression technology for a video image becomes indispensable.

Performing ultra high efficiency compression on a video image by fully utilizing characteristics of a 4K/8K image (or picture) and a computer screen image (or picture) is also a main objective of a latest international video compression standard High Efficiency Video Coding (HEVC) under formulation and a plurality of other international standards, national standards and industrial standards.

A natural form of a digital video signal is a sequence of images (or pictures). An image is usually a rectangular region formed by a plurality of pixels. A digital video signal, which is sometimes called as a video sequence or a sequence for short, is formed by dozens of and even tens of thousands of frames of images (or pictures). Coding a digital video signal is to code each image. At any time, the image which is being coded is called as a current coding image. Similarly, decoding a video bitstream, which is sometimes called as a bitstream or a stream for short, obtained by compressing the digital video signal is to decode a bitstream of each image. At any time, the image which is being decoded is called as a current decoding image. The current coding image or the current decoding image may be collectively called as a current image.

In almost all international standards for video image coding such as Moving Picture Experts Group (MPEG-1/2/4) H.264/Advanced Video Coding (AVC) and HEVC, when an image is being coded (and correspondingly being decoded), the image may be partitioned into a plurality of sub-images with M×M pixels, called as coding blocks (which are decoding blocks from the point of decoding, collectively called as coding and decoding blocks) or "Coding Units (CUs)", and the blocks of the image are coded one by one by taking a CU as a basic coding unit. M may be usually 4, 8, 16, 32 or 64. Therefore, coding a video sequence is to sequentially code CUs of images one by one. At any time, a CU which is being coded is called as a current coding CU. Similarly, decoding a bitstream of a video image sequence is to sequentially decode CUs of images to finally reconstruct the whole video sequence. At any time, a CU which is being decoded is called as a current decoding CU. The current coding CU or the current decoding CU may be collectively called as a current CU.

In order to achieve adaptability to differences of contents and properties of different image parts in an image and pertinently and most effectively perform coding, sizes of different CUs in the image may be different, for example, some CUs may have a size of 8×8, while some CUs may have a size of 64×64. In order to seamlessly splice CUs with different sizes, an image may usually be partitioned into "Largest Coding Units (LCUs)" with completely the same size of, e.g., N×N pixels, at first, and then each LCU may be further partitioned into multiple tree-structured CUs of which sizes may not be the same. Therefore, the LCUs may also be called as "Coding Tree Units (CTUs)". For example, an image may be partitioned into LCUs with completely the same size of, e.g., 64×64 pixels (N=64) at first. Among these LCUs, a certain LCU may be formed by three CUs with 32×32 pixels and four CUs with 16×16 pixels, and in such a manner, the seven tree-structured CUs may form a complete CTU. Another LCU may be formed by two CUs with 32×32 pixels, three CUs with 16×16 pixels and twenty CUs with 8×8 pixels, and in such a manner, the 25 tree-structured CUs may form a complete CTU. Coding an image is to sequentially code CUs in CTUs. In the international standard HEVC, LCU and CTU are synonyms. A CU of which a size is equal to that of a CTU is called as a CU with a depth 0. CUs obtained by equally partitioning a CU with the depth 0 into quarters, respectively being upper, lower, left and right parts of this CU, are called as CUs with a depth 1. CUs obtained by equally partitioning a CU with the depth 1 into quarters, respectively being upper, lower, left and right parts of this CU, are called as CUs with a depth 2. CUs obtained by equally partitioning a CU with the depth 2 into quarters, respectively being upper, lower, left and right parts of this CU, are called as CUs with a depth 3. The sub-regions may include, but not limited to, one or more Prediction Units (PUs), one or more Transform Units (TUs) and one or more Asymmetric Motion Partitioning (AMP) regions.

Pixel representation formats may include the following formats.

1) A colour pixel usually consists of three components. Two most common pixel colour formats include a Green, Blue and Red (GBR) colour format consisting of a green component, a blue component and a red component, and a YUV colour format, consisting of a luma component and two chroma components. Colour formats collectively called as YUV colour formats may actually include multiple colour formats, such as a YCbCr colour format. Therefore, when a CU is coded, one CU may be partitioned into three component planes (a G plane, a B plane and an R plane, or a Y plane, a U plane and a V plane). The three component planes may be coded respectively; alternatively, the three components of each pixel may be bundled and combined into a triple, and the CU formed by these triples may be coded in its entirety. The former pixel and component arrangement manner is called as a planar format of an image (and its CUs), while the latter pixel and component arrangement manner is called as a packed format of the image (and its CUs). A GBR colour format and a YUV colour format of a pixel are both three-component representation formats of the pixel.

2) Besides a three-component representation format of a pixel, another common representation format of the pixel is a palette index representation format. In the palette index representation format, a numerical value of one pixel may be represented by an index of a palette. Numerical values or approximate numerical values of three components of the pixel to be represented are stored in a palette space, and an address in the palette is called as an index of the pixel stored in the address. One index may represent one component of a pixel, and one index may alternatively represent three components of a pixel. There may be one or more palettes. Under the condition that there are multiple palettes, a complete index may be formed by two parts, i.e. a palette number and an index of the palette with the palette number. An index representation format of a pixel is to represent the pixel with an index. The index representation format of the pixel is also called as an indexed color or pseudo color representation format of the pixel, or is usually directly called as an indexed pixel or a pseudo pixel or a pixel index or an index. An index may also be called as an index number sometimes. Representing a pixel in an index representation format may also be called as indexing or indexation.

3) Other common pixel representation formats include a CMYK representation format and a grayscale representation format.

According to whether to perform down-sampling on a chroma component or not, a YUV colour format may also be subdivided into a plurality of sub-formats, for example, a YUV4:4:4 pixel colour format under which one pixel is formed by one Y component, one U component and one V component; a YUV4:2:2 pixel colour format under which two horizontally adjacent pixels are formed by two Y components, one U component and one V component; and a YUV4:2:0 pixel colour format under which four horizontally and vertically adjacent pixels arranged according to 2×2 spatial positions are formed by four Y components, one U component and one V component. One component is usually represented by a number represented by 8-16 bits. The YUV4:2:2 pixel colour format and the YUV4:2:0 pixel colour format are both obtained by executing down-sampling of chroma component on the YUV4:4:4 pixel colour format. One pixel component may also be called as one pixel sample, or may be simply called as one sample.

A most basic element during coding or decoding may be one pixel, may alternatively be one pixel component, and may alternatively be one pixel index (i.e. indexed pixel). One pixel or pixel component or indexed pixel adopted as the most basic element for coding or decoding may collectively be called as one pixel sample, and sometimes may also be collectively called as one pixel value or simply called as one sample.

An outstanding characteristic of a computer screen image is that there may usually be many similar and even completely the same pixel patterns in the same image. For example, a Chinese or foreign character frequently appearing in a computer screen image may be formed by a few basic strokes, and many similar or the same strokes may be found in the same image. A common menu, icon and the like in a computer screen image may also have many similar or the same patterns. Therefore, a coding technique usually adopted for image and video compression may include the following copying techniques.

1) One copying technique is intraframe string copying, i.e. intraframe string matching or called as string matching or string copying or pixel string copying. During pixel string copying, a current coding block or current decoding block (called as a current block) may be partitioned into multiple pixel sample strings with variable lengths. Here, the string may refer to arranging pixel samples in a two-dimensional region in any shape into a string of which a length is far larger than a width (for example, a string of which a width is one pixel sample while a length is 37 pixel samples; or a string of which a width is two pixel samples while a length is 111 pixel samples, usually under, but not limited to, the condition that the length is an independent coding or decoding parameter while the width is a parameter which is predetermined or derived from another coding or decoding parameter). A basic operation of string copying coding or decoding is to copy a reference string from a reconstructed reference pixel sample set for each coding string or decoding string (called as a current string for short) in the current block and assign a numerical value of the reference string to the current string. A copying parameter of the string copying technique may include: a displacement vector of the current string, which indicates a relative position between the reference string and the current string; and a copying length, i.e. copying size, of the current string which indicates the length, i.e., the number of pixel samples, of the current string. The length of the current string is equal to a length of the reference string. One current string has one displacement vector and one copying length. The number of displacement vectors and the number of copying lengths are equal to the number of strings into which a current block is partitioned.

2) Another copying technique is palette index copying, i.e. palette or called as index copying. In palette coding and corresponding decoding process, one palette is constructed or acquired at first, then part or all of pixels of a current coding block or current decoding block (called as a current block for short) are represented with an index of the palette, and then the index is coded and decoded. The index may be coded or decoded in, but not limited to, the following manner. An index of a current block may be partitioned into multiple variable-length index strings for index string copying coding and decoding. A basic operation of index string copying coding and decoding is to copy a reference index string from an indexed reconstructed reference pixel sample set for each index coding string or index decoding string (called as a current index string for short) in the current block and assign an index numerical value of the reference index string to a current index string. A copying parameter of the index string copying technique may include a displacement vector of the current index string, which indicates a relative position between the reference index string and the current index string; and a copying length, i.e. copying size, of the current index string, which indicates the length, i.e. the number of corresponding pixel samples, of the current index string. The length of the current index string is equal to a length of the reference index string. One current index string has one displacement vector and one copying length. The number of displacement vectors and the number of copying lengths are equal to the number of index strings into which a current block is partitioned.

3) Still another copying technique is a mixed copying technique mixing pixel string copying and index copying. When a current coding block or current decoding block (called as a current block for short) is being coded or decoded, a pixel string copying technique may be adopted for part or all of pixels, and an index copying technique may be adopted for part or all of the pixels.

4) Other copying techniques further include a block copying technique, a micro-block copying technique, a strip copying technique, a rectangular copying technique, a mixed copying technique mixing a plurality of copying techniques, and the like.

Here, a block in the block copying technique, a micro-block in the micro-block copying technique, a strip in the strip copying technique, a string in the string copying technique, a rectangle in the rectangular copying technique and a pixel index string in the palette index manner may be collectively called as pixel sample segments, or called as sample segments for short. A basic element of a sample segment may be a pixel or a pixel component or a pixel index. One sample segment has one copying parameter for representing a relationship between a current pixel sample segment and a reference pixel sample segment. One copying parameter may include a plurality of copying parameter components. The copying parameter components may at least include: a displacement vector horizontal component, a displacement vector vertical component, a copying length, a copying width, a copying height, a rectangle width, a rectangle length and an unmatched pixel (also called as a reference-free pixel, i.e. a non-copying pixel which is not copied from another place).

FIG. 1 shows an exemplary scanning manner. At present, during scanning, a complete row (or column) is scanned, and after the complete row (or column) is scanned, a next row (or column) is scanned. Therefore, in a related coding/decoding technology, an image may be scanned only in a fixed manner at present, which may greatly influence image coding compression efficiency and image decoding decompression efficiency.

SUMMARY

Some embodiments of the present disclosure provide an image coding method and apparatus and an image decoding method and apparatus, which may at least solve a problem of lower efficiency caused by scanning only in a fixed manner in the related coding/decoding technology.

According to an embodiment of the present disclosure, an image coding method is provided, which may include the following acts. A scanning manner parameter of a coding block may be determined, and the scanning manner parameter may include at least one of: a region indication parameter used for determining a scanning region of the coding block and a scanning indication parameter used for determining a scanning order of pixels in a scanning region of the coding block. Predicted values of part or all of pixels in the coding block may be determined according to the scanning manner parameter. The coding block may be coded according to the predicted values, and a coding result may be written into a bitstream.

In an exemplary embodiment, the act of determining the scanning manner parameter of the coding block may include the following acts. A characteristic parameter of pixel samples in the coding block and/or pixel samples in an adjacent region of the coding block may be extracted. The scanning manner parameter of the coding block may be determined according to the characteristic parameter.

In an exemplary embodiment, the act of extracting the characteristic parameter of the pixel samples in the coding block and/or the pixel samples in the adjacent region of the coding block may include extracting a texture characteristic of the pixel samples in the coding block and/or the pixel samples in the adjacent region of the coding block, and the characteristic parameter may include the texture characteristic. The act of determining the scanning manner parameter of the coding block according to the characteristic parameter may include determining the scanning manner parameter of the coding block according to the texture characteristic.

In an exemplary embodiment, the act of extracting the texture characteristic of the pixel samples in the coding block and/or the pixel samples in the adjacent region of the coding block may include the following acts. Filtering processing may be performed on the pixel samples in the coding block and/or the pixel samples in the adjacent region of the coding block. The texture characteristic may be extracted according to a filtering processing result.

In an exemplary embodiment, the act of performing the filtering processing on the pixel samples in the coding block and/or the pixel samples in the adjacent region of the coding block may include performing edge detection filtering on the pixel samples in the coding block and/or the pixel samples in the adjacent region of the coding block.

In an exemplary embodiment, the act of determining the scanning manner parameter of the coding block according to the texture characteristic may include determining the region indication parameter in the scanning manner parameter according to the texture characteristic to obtain the scanning region of the coding block. In the exemplary embodiment, the scanning region of the coding block may include at least one of the following conditions: the coding block may be determined as one scanning region, and the coding block may be partitioned into multiple scanning regions.

In an exemplary embodiment, the act of determining the region indication parameter in the scanning manner parameter according to the texture characteristic to obtain the scanning region of the coding block may include the following acts. It may be judged whether a texture direction indicated by the texture characteristic is intersected with a boundary of the coding block or not. When the texture direction is intersected with the boundary of the coding block, the coding block may be partitioned into multiple scanning regions in a horizontal or vertical direction by taking a position of an intersection of the texture direction and the boundary of the coding block as an origin. When the texture direction is not intersected with the boundary of the coding block, the coding block may be determined as one scanning region.

In an exemplary embodiment, the act of partitioning the coding block into the multiple scanning regions in the horizontal or vertical direction by taking the position of the intersection of the texture direction and the boundary of the coding block as the origin may include one of the following acts. When the texture direction is intersected with a horizontal boundary of the coding block, the coding block may be partitioned into multiple scanning regions in the vertical direction perpendicular to the horizontal boundary by taking a position of an intersection of the texture direction and the boundary of the coding block as an origin. When the texture direction is intersected with a vertical boundary of the coding block, the coding block may be partitioned into multiple scanning regions in the horizontal direction perpendicular to the vertical boundary by taking a position of an intersection of the texture direction and the boundary of the coding block as an origin.

In an exemplary embodiment, the act of determining the scanning manner parameter of the coding block according to the texture characteristic may include the following act. The scanning indication parameter in the scanning manner parameter may be set according to a texture direction indicated by the texture characteristic. In this exemplary embodiment, the scanning indication parameter may indicate the scanning order of the pixels in the scanning region of the coding block.

In an exemplary embodiment, the act of determining the scanning manner parameter of the coding block according to the characteristic parameter may include the following acts. Correlation of the pixel samples in the scanning region of the coding block may be acquired, and the correlation may include at least one of: row correlation and column correlation. The correlation of the pixel samples may be compared. The scanning order of the pixels in the scanning region of the coding block may be determined according to a comparison result.

In an exemplary embodiment, the act of determining the scanning order of the pixels in the scanning region of the coding block according to the comparison result may include the following act. A scanning order indicated by a maximum correlation in the comparison result may be set as the scanning order of the pixels in the scanning region.

In an exemplary embodiment, the act of determining the predicted values of part or all of the pixels in the coding block according to the scanning manner parameter may include the following acts. Reference values of the pixel samples of part or all of the pixels in the coding block may be determined as the predicted values. Combinations of the pixel samples of part or all of the pixels in the coding block may be determined according to the scanning manner parameter, and combinations of the reference values corresponding to the combinations of the pixel samples may be determined as the predicted values.

In an exemplary embodiment, the scanning region, indicated by the region indication parameter, of the coding block may include at least one of the following conditions: the coding block may be determined as one scanning region, and the coding block may be partitioned into multiple scanning regions. The scanning order, indicated by the scanning indication parameter, of the pixels in the scanning region of the coding block may include at least one of: a horizontal Z-shaped scanning order, a vertical Z-shaped scanning order, a horizontal arched scanning order, a vertical arched scanning order, a raster scanning order, a Zigzag scanning order, a saw-toothed scanning order, a diagonal Z-shaped scanning order and a diagonal arched scanning order.

In an exemplary embodiment, the act of writing the coding result into the bitstream may include the following act. The coding result and the scanning manner parameter may be written into one or more data units in the bitstream according to a predetermined format. In this exemplary embodiment, the data units may include at least one of: a video parameter set, a sequence parameter set, a picture parameter set, a slice header, a CTU, a CU and a data unit where the coding block is located.

According to an embodiment of the present disclosure, an image decoding method is provided, which may include the following acts. A bitstream may be parsed to acquire a decoding parameter of a decoding block. A scanning manner parameter may be acquired according to the decoding parameter, and the scanning manner parameter may include: a region indication parameter used for determining a scanning region of the decoding block, and/or a scanning indication parameter used for determining a scanning order of pixels in a scanning region. Reconstructed values of part or all of pixels in the decoding block may be determined according to the region indication parameter and/or the scanning indication parameter.

In an exemplary embodiment, the act of acquiring the scanning manner parameter according to the decoding parameter may include the following act. The region indication parameter and/or scanning indication parameter in the scanning manner parameter may be acquired from the decoding parameter to obtain the scanning region of the decoding block. In this exemplary embodiment, the scanning region of the decoding block may include at least one of the following conditions: the decoding block may be determined as one scanning region, and the decoding block may be partitioned into multiple scanning regions.

In an exemplary embodiment, the act of acquiring the scanning manner parameter according to the decoding parameter may include the following acts. A characteristic parameter of pixel samples in an adjacent region of the decoding block may be extracted, and the characteristic parameter may include a texture characteristic. The scanning manner parameter of the decoding block may be determined according to the texture characteristic.

In an exemplary embodiment, the act of extracting the characteristic parameter of the adjacent region of the decoding block may include the following acts. Filtering processing may be performed on reconstructed values of decoded pixels in the adjacent region of the decoding block. The texture characteristic may be extracted according to a filtering processing result.

In an exemplary embodiment, the act of performing the filtering processing on the reconstructed values of the decoded pixels in the adjacent region of the decoding block may include performing edge detection filtering on the reconstructed values of the decoded pixels in the adjacent region of the decoding block.

In an exemplary embodiment, the act of determining the scanning manner parameter of the decoding block according to the texture characteristic may include the following acts. It may be judged whether a texture direction indicated by the texture characteristic is intersected with a boundary of the decoding block or not. When the texture direction is intersected with the boundary of the decoding block, the decoding block may be partitioned into multiple scanning regions in a horizontal or vertical direction by taking a position of an intersection of the texture direction and the boundary of the coding block as an origin. When the texture direction is not intersected with the boundary of the decoding block, the decoding block may be determined as one scanning region.

In an exemplary embodiment, the act of determining the scanning manner parameter of the decoding block according to the texture characteristic may include the following acts. The scanning order of the pixels in the scanning region of the decoding block may be set according to a texture direction indicated by the texture characteristic.

In an exemplary embodiment, the act of acquiring the scanning manner parameter according to the decoding parameter may include the following acts. A mode indication parameter used for indicating a coding mode may be acquired according to the decoding parameter. The scanning manner parameter may be acquired from the mode indication parameter.

In an exemplary embodiment, the act of determining the reconstructed values of part or all of the pixels in the decoding block according to the region indication parameter and/or the scanning indication parameter may include one of the following acts. Predicted values of part or all of the pixels in the decoding block may be acquired, and the predicted values may be determined as the reconstructed values. Predicted values and corresponding predicted difference values of part or all of the pixels in the decoding block may be acquired, and sum values or difference values between the predicted values and the predicted difference values may be determined as the reconstructed values.

In an exemplary embodiment, the act of acquiring the predicted values of part or all of the pixels in the decoding block may include the following acts. Reference values of pixel samples of part or all of the pixels in the decoding block may be determined as the predicted values. Combinations of the pixel samples of part or all of the pixels in the decoding block may be determined according to the scanning manner parameter, and combinations of the reference values corresponding to the combinations of the samples may be determined as the predicted values.

In an exemplary embodiment, the scanning region, indicated by the region indication parameter, of the decoding block may include at least one of the following conditions: the decoding block may be determined as one scanning region, and the decoding block may be partitioned into multiple scanning regions. The scanning order, indicated by the scanning indication parameter, of the pixels in the scanning region of the coding block may include at least one of: a horizontal Z-shaped scanning order, a vertical Z-shaped scanning order, a horizontal arched scanning order, a vertical arched scanning order, a raster scanning order, a Zigzag scanning order, a saw-toothed scanning order, a diagonal Z-shaped scanning order and a diagonal arched scanning order.

In an exemplary embodiment, the act of parsing the bitstream to acquire the decoding parameter of the decoding block may include the following act. The decoding parameter may be acquired from one or more data units in the bitstream. In this exemplary embodiment, the data units may include at least one of: a video parameter set, a sequence parameter set, a picture parameter set, a slice header, a CTU, a CU and a data unit where the decoding block is located.

According to another aspect of the present disclosure, an image coding apparatus is provided, which may include a first determination unit, a second determination unit and a coding unit. The first determination unit may be configured to determine a scanning manner parameter of a coding block, and the scanning manner parameter may include at least one of: a region indication parameter used for determining a scanning region of the coding block and a scanning indication parameter used for determining a scanning order of pixels in a scanning region of the coding block. The second determination unit may be configured to determine predicted values of part or all of pixels in the coding block according to the scanning manner parameter. The coding unit may be configured to code the coding block according to the predicted values, and write a coding result into a bitstream.

According to another embodiment of the present disclosure, an image decoding apparatus is provided, which may include a first acquisition unit, a second acquisition unit and a determination unit. The first acquisition unit may be configured to parse a bitstream to acquire a decoding parameter of a decoding block. The second acquisition unit may be configured to acquire a scanning manner parameter according to the decoding parameter, and the scanning manner parameter may include: a region indication parameter used for determining a scanning region of the decoding block, and/or a scanning indication parameter used for determining a scanning order of pixels in a scanning region. The determination unit may be configured to determine reconstructed values of part or all of pixels in the decoding block according to the region indication parameter and/or the scanning indication parameter.

According to some embodiments of the present disclosure, the scanning manner parameter of the coding block may be determined, and the scanning manner parameter may include at least one of: the region indication parameter used for determining the scanning region of the coding block and the scanning indication parameter used for determining the scanning order of the pixels in the scanning region of the coding block; the predicted values of part or all of the pixels in the coding block may be determined according to the scanning manner parameter; and the coding block may be coded according to the predicted values, and the coding result may be written into the bitstream.

According to some other embodiments of the present disclosure, the bitstream may be parsed to acquire the decoding parameter of the decoding block; the scanning manner parameter may be acquired according to the decoding parameter, where the scanning manner parameter may include: the region indication parameter used for determining the scanning region of the decoding block, and/or the scanning indication parameter used for determining the scanning order of the pixels in the scanning region; and the reconstructed values of part or all of the pixels in the decoding block may be determined according to the region indication parameter and/or the scanning indication parameter.

That is, scanning coding/decoding may be performed on the coding/decoding block by adopting a split scanning manner, thereby partitioning the coding/decoding block into smaller scanning regions to achieve an effect of improving coding compression efficiency and decoding decompression efficiency and further solve a problem of lower efficiency caused by scanning only in a fixed manner in a coding technology.

BRIEF DESCRIPTION OF THE DRAWINGS

The drawings described here are adopted to provide a further understanding to the present disclosure, and form a part of the present disclosure. Schematic embodiments of the present disclosure and descriptions thereof are adopted to explain the present disclosure and not intended to form limits to the present disclosure. In the drawings.

DETAILED DESCRIPTION OF THE EMBODIMENTS

The present disclosure will be described below in detail with reference to the drawings and in combination with embodiments. It should be noted that the embodiments in the present disclosure and characteristics in the embodiments may be combined without conflicts.

It should be noted that terms in the specification, claims and drawings of the present disclosure are not intended to form improper limits to the present disclosure. The embodiments in the present disclosure and the characteristics in the embodiments may be combined without conflicts.

First Embodiment

Figure 1:
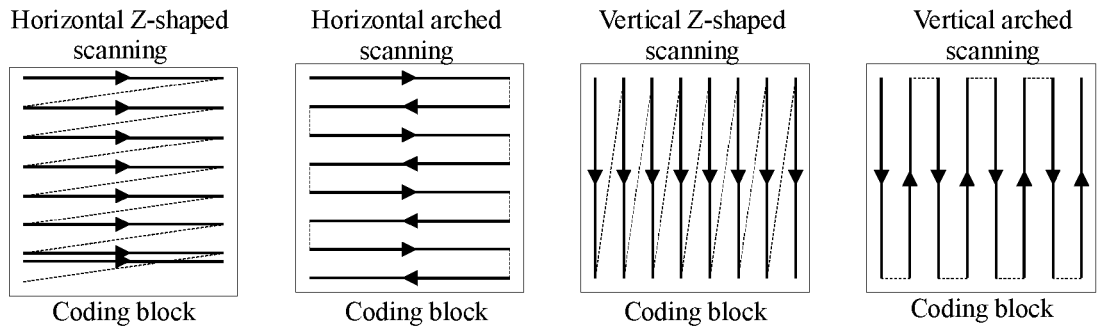
FIG. 1 is a schematic diagram of an exemplary scanning manner.
Figure 2:
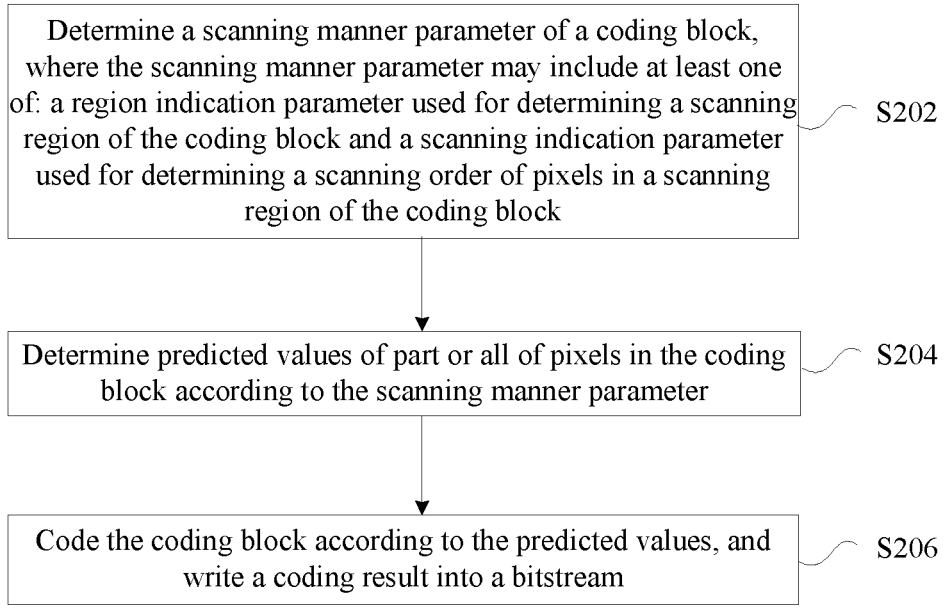
FIG. 2 is a flowchart of an exemplary image coding method according to an embodiment of the present disclosure.

The embodiment provides an image coding method. FIG. 2 is a flowchart of an exemplary image coding method according to an embodiment of the present disclosure. As shown in FIG. 2, the flow includes the following acts S202 to S206.

At act S202, a scanning manner parameter of a coding block may be determined. The scanning manner parameter may include at least one of: a region indication parameter used for determining a scanning region of the coding block and a scanning indication parameter used for determining a scanning order of pixels in a scanning region of the coding block.

At act S204, predicted values of part or all of pixels in the coding block may be determined according to the scanning manner parameter.

At act S206, the coding block may be coded according to the predicted values, and a coding result may be written into a bitstream.

In an exemplary embodiment, the image coding method may be applied to, but not limited to, a video image coding process, and for example, may be applied to, but not limited to, a packed-format image coding or component planar-format image coding process. In a process of coding a video image, split scanning may be performed on a coding block to be coded according to an indication of a determined scanning manner parameter, and the coding block may be written into a video bitstream. That is, the coding block may be split into K scanning regions for scanning according to a corresponding scanning order, so as to solve a problem of lower efficiency caused by adoption of a fixed scanning manner for row (or column) scanning and further achieve an effect of improving compression efficiency in the image coding process. In some embodiment, K may meet the following condition: 1<K<16. K=1 represents 1-split, i.e. non-split or called as single-split. K>1 represents multi-split, i.e. split scanning.

In the embodiment, the scanning manner parameter of the coding block may be determined when the coding block to be coded is coded. The scanning manner parameter may include at least one of: the region indication parameter used for determining the scanning region of the coding block and the scanning indication parameter used for determining the scanning order of the pixels in the scanning region of the coding block. The predicted values of part or all of the pixels in the coding block may be determined according to the determined scanning manner parameter. The coding block may be coded according to the predicted values, and the coding result may be written into the bitstream. That is, scanning coding may be performed on the coding block by adopting a split scanning manner, and the coding result may be written into the video bitstream. In the embodiment, the coding block may be partitioned into smaller scanning regions to achieve the effect of improving coding efficiency.

In the embodiment, it should be noted that "pixel sample", "pixel value", "sample", "indexed pixel" and "pixel index" are synonyms, and whether these terms represent a "pixel" or "a pixel component" or an "indexed pixel", or represent any one of the three should be clear to a skilled in the art based on the context. If this information cannot be clearly determined based on the context, any one of the three is represented.

In addition, the coding block may be a region formed by a plurality of pixel values. A shape of the coding block may include, but not limited to, at least one of the following shapes: a rectangle, a square, a parallelogram, a trapezoid, a polygon, a round, an ellipse or any other shape. Herein, the rectangle may also include a rectangle of which a width or height is one pixel, that is, a rectangle which is degenerated into a line (i.e. a line segment or a line shape). In the embodiment, in one image, each coding block may have a different shape and size. In addition, in one image, some or all of coding blocks may have mutually overlapped parts, or none of the coding blocks may be overlapped. Furthermore, one coding block may be formed by "pixels", or by "components of the pixels", or by "indexed pixels", or by mixture of the three, and may alternatively be formed by mixture of any two of the three, which will not be limited in the embodiment. From the point of video image coding, a coding block may refer to a region which is coded in an image, for example, including, but not limited to, at least one of: an LCU, a CTU, a CU, a sub-region of the CU, a PU or a TU.

In an exemplary embodiment, the scanning order of the pixels in the scanning region may include at least one of: a horizontal Z-shaped scanning order, a vertical Z-shaped scanning order, a horizontal arched scanning order, a vertical arched scanning order, a raster scanning order, a Zigzag scanning order, a saw-toothed scanning order, a diagonal Z-shaped scanning order and a diagonal arched scanning order.

In an exemplary embodiment, a scanning manner may include, but not limited to, at least one of: 2-split, 4-split, 8-split and 16-split. In a multi-split process, scanning orders of different scanning regions may be the same, or may be different, which will not be limited in the embodiment.

Figure 3:
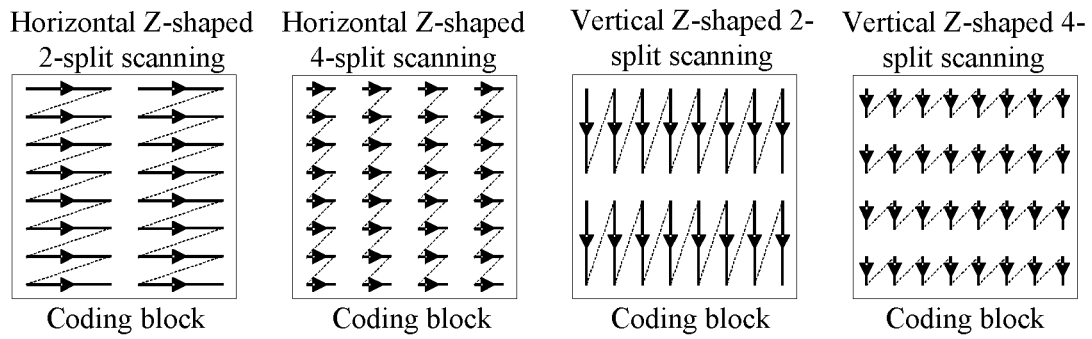
FIG. 3 is a schematic diagram of a first exemplary scanning manner according to an embodiment of the present disclosure.
Figure 4:
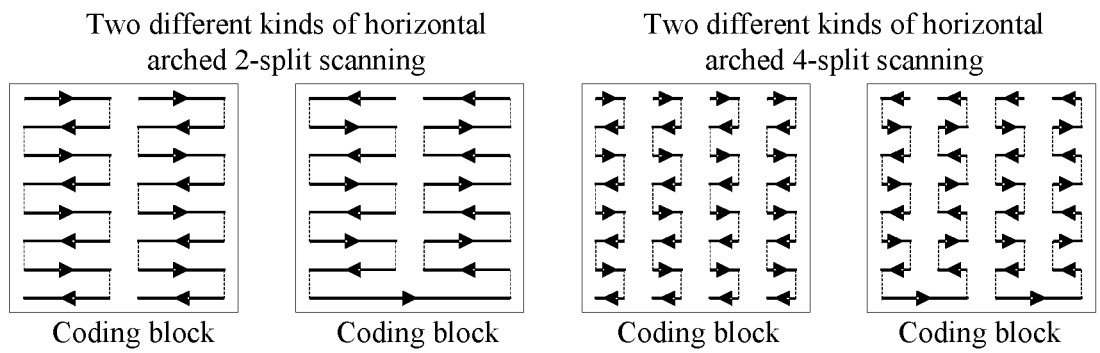
FIG. 4 is a schematic diagram of a second exemplary scanning manner according to an embodiment of the present disclosure.
Figure 5:
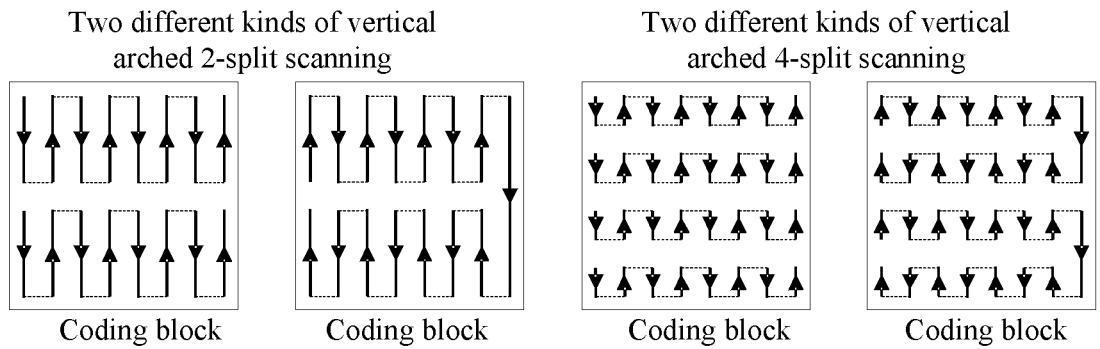
FIG. 5 is a schematic diagram of a third exemplary scanning manner according to an embodiment of the present disclosure.
Figure 6:
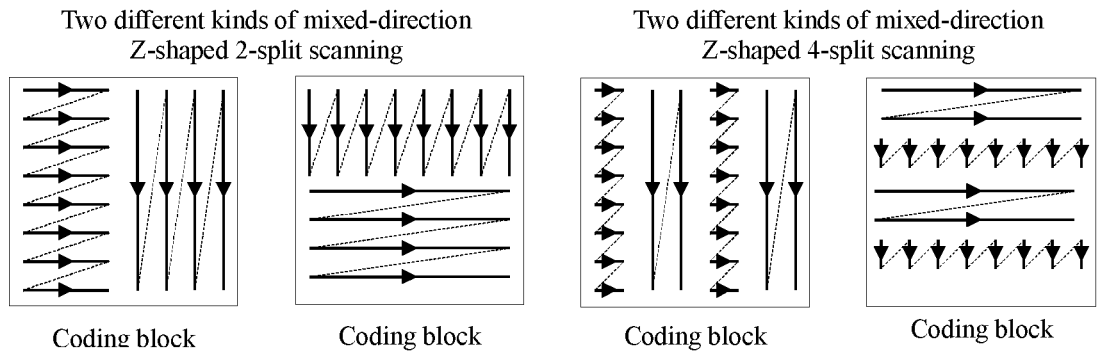
FIG. 6 is a schematic diagram of a fourth exemplary scanning manner according to an embodiment of the present disclosure.
Figure 7:
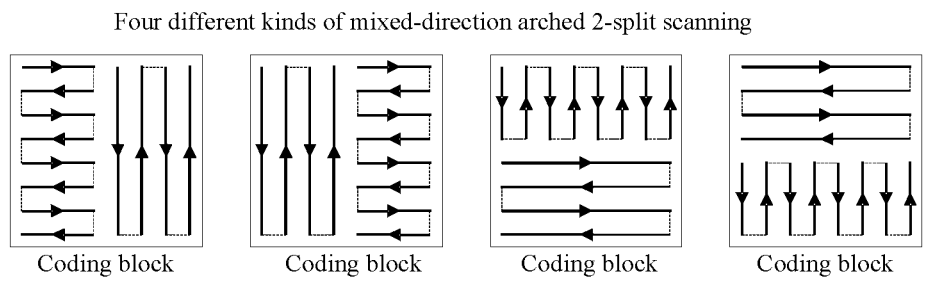
FIG. 7 is a schematic diagram of a fifth exemplary scanning manner according to an embodiment of the present disclosure.
Figure 8:
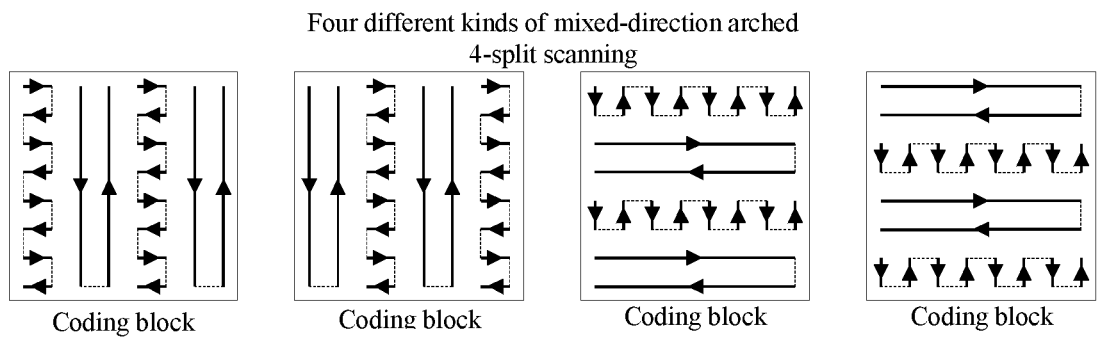
FIG. 8 is a schematic diagram of a sixth exemplary scanning manner according to an embodiment of the present disclosure.
Figure 9:
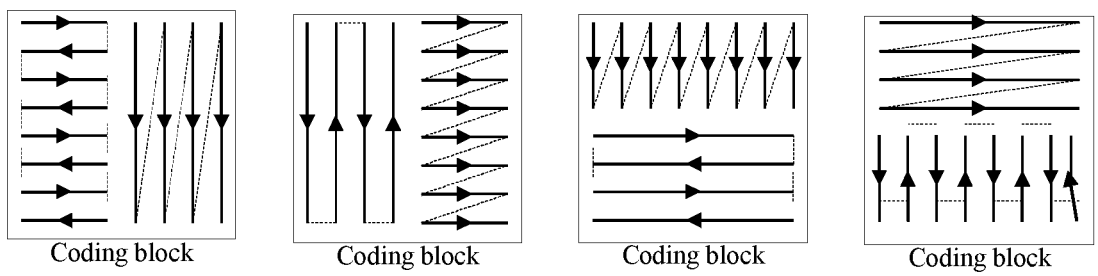
FIG. 9 is a schematic diagram of a seventh exemplary scanning manner according to an embodiment of the present disclosure.

For example, FIG. 3 shows four kinds of optional scanning indicated by the scanning manner parameter: 1) horizontal Z-shaped 2-split scanning performed on the coding block; 2) horizontal Z-shaped 4-split scanning performed on the coding block; 3) vertical Z-shaped 2-split scanning performed on the coding block; and 4) vertical Z-shaped 4-split scanning performed on the coding block. For another example, FIG. 4 to FIG. 9 show multiple kinds of optional scanning obtained by combining different scanning manners and different scanning orders and indicated by the scanning manner parameter.

In an exemplary embodiment, the act of determining the scanning manner parameter of the coding block may be achieved in one of the following manners.

1) A characteristic parameter of pixel samples in the coding block and/or pixel samples in an adjacent region of the coding block may be extracted. The scanning manner parameter of the coding block may be determined according to the characteristic parameter.

2) A scanning manner parameter capable of achieving optimal coding efficiency of the coding block in candidate scanning manner parameters of the coding block may be set as the scanning indication parameter of the coding block.

Optionally, in the manner 1) of the embodiment, a texture characteristic, but not limited thereto, of the pixel samples in the coding block and/or the pixel samples in the adjacent region of the coding block may be extracted, so as to implement determination of the scanning manner parameter according to the texture characteristic. In the embodiment, the characteristic parameter may include the texture characteristic. In the manner 2) of the embodiment, the candidate scanning manner parameters may represent, but not limited to, all optional scanning manner parameters, and coding efficiency of these scanning manner parameters in a coding process may be sequentially compared, so as to set the scanning manner parameter capable of achieving the optimal coding efficiency as the final scanning manner parameter of the image coding block. For example, maximum coding efficiency may be determined by virtue of an existing rate distortion optimization method.

It should be noted that, in the embodiment, a pixel may indicate a minimum display unit of an image, and there may be one (such as monochromic grayscale image) or three (such as RGB and YUV) effective sampling values, i.e. pixel samples, at one pixel position. In the embodiment, pixels may be used to describe positions, and pixel samples may be used to describe and process sampling values at pixel positions.

In an exemplary embodiment, the act of determining the scanning manner parameter of the coding block according to the texture characteristic may include the following acts.

1) The region indication parameter in the scanning manner parameter may be determined according to the texture characteristic to obtain the scanning region of the coding block. In the embodiment, the scanning region of the coding block may include at least one of the following conditions: the coding block may be determined as one scanning region, and the coding block may be partitioned into multiple scanning regions.

It should be noted that, in the embodiment, the coded scanning region may be determined by, but not limited to, judging whether a texture direction indicated by the texture characteristic is intersected with a boundary of the coding block or not. For example, the coding block may be partitioned into multiple scanning regions in a direction perpendicular to the boundary when the texture direction is intersected with the boundary of the coding block. Here, partitioning directions of the multiple scanning regions may alternatively be determined according to, but not limited to, the texture characteristic (i.e. texture direction) of image content in the coding block, for example, partitioning directions of the multiple scanning regions may be consistent with the texture direction.

2) The scanning indication parameter in the scanning manner parameter may be set according to a texture direction indicated by the texture characteristic. The scanning indication parameter may indicate the scanning order of the pixels in the scanning region of the coding block.

In an exemplary embodiment, the scanning order may include, but not limited to, at least one of the following conditions:

(1) the texture direction may be set as the scanning order of the pixels in the scanning region of the coding block; and (2) correlation of the pixel samples in the scanning region of the coding block may be acquired, the correlation of the pixel samples may be compared, and the scanning order of the pixels in the scanning region of the coding block may be determined according to a comparison result.

It should be noted that, in the manner 2) of the embodiment, the correlation may include, but not limited to, at least one of: row correlation and column correlation. The scanning order may be set in, but not limited to, a manner of setting a scanning order indicated by a maximum correlation in the comparison result as the scanning order of the pixels in the scanning region.

In an exemplary embodiment, the act of determining the predicted values of part or all of the pixels in the coding block may include the following acts. Reference values of the pixel samples of part or all of the pixels in the coding block may be determined as the predicted values. Combinations of the pixel samples of part or all of the pixels in the coding block may be determined according to the scanning manner parameter, and combinations of the reference values corresponding to the combinations of the pixel samples may be determined as the predicted values.

In an exemplary embodiment, the act of writing the coding result into the bitstream may include the following act. The coding result and the scanning manner parameter may be written into one or more data units in the bitstream according to a predetermined format. The data units may include at least one of: a video parameter set, a sequence parameter set, a picture parameter set, a slice header, a CTU, a CU and a data unit where the coding block is located.

It should be noted that, in the embodiment, coding the coding block may refer to performing compressed coding on original sampling values (also called as pixel values in the embodiment) of the pixels in the coding block, that is, the original sampling values (i.e. the pixel values) of the pixels in the coding block may be mapped (destructively) into a series of parameters, and these parameters indicate a prediction method adopted for the coding block, a construction method for the predicted values and predicted differences. In the embodiment of the present disclosure, since the split scanning manner may be adopted to perform coding scanning on the coding block, it may be suggested to code information identifying the split scanning manner used for the coding block, i.e. the scanning manner parameter, in the bitstream. The reference values may also be called as reference samples.

That is, two-dimensional pixels in the coding block may be partitioned into some columns of strings formed by the pixels continuously arranged according to the scanning order according to the scanning manner parameter, and these strings may be continuously arranged into two-dimensional pixel arrangement in the coding block according to the scanning order. Each string has its own matched string (i.e. predicted value), and the matched string of each string may be continuously arranged into the predicted values of the two-dimensional pixels in the coding block according to the scanning order. The act of writing into the bitstream may be implemented in the following manner. A reference numerical value represented by an ordinary decimal numeral system may be converted into a binary symbol string represented by bits 0 and 1, the binary symbol string may be directly used as a bitstream, the binary symbol string may alternatively be mapped into another new binary symbol string by virtue of, for example, an arithmetic entropy coding method, and the new binary symbol string may be determined as the bitstream. The embodiment has no limits for the specific manner adopted.

Descriptions will specifically be made in combination with the following example. A two-dimensional matrix in the coding block to be coded of the image is as follows:

[ABCD
EFGH
IJKL
MNOP].

It should be noted that, if scanning is performed according to an existing scanning manner, the two-dimensional matrix may be arranged into one-dimensional arrangement such as [ABCDEFGHIJKLMNOP], [AEIMBFJNCGKODHLP], [ABCDHGFEIJKLPONM] or [AEIMNJFBCGKOPLHD]. That is, the existing fixed scanning manner may only perform the scanning according to the above four kinds of scanning arrangement.

While in the embodiment, the pixels which are freely continuously arranged may form strings according to a one-dimensional arrangement order. Taking the one-dimensional arrangement is [ABCDHGFEIJKLPONM] as an example, the one-dimensional arrangement order may be partitioned into four 4 strings, and positions of the four strings in the two-dimensional matrix may be as follows: string 1 [AB] (bold), string 2 [CDHGF] (underlined), string 3 [EIJK] (italic) and string 4 [LPONM] (in a normal format):

[AB<u>CD</u>
*E*<u>FGH</u>
*IJK*L
MNOP].

In a practical matched string expression process, it is only needed to sequentially point out four pieces of expression information [matching position 1, matching length=2], [matching position 2, matching length=5], [matching position 3, matching length=4] and [matching position 4, matching length=5]. During conformal matching, for strings marked as different formats in the above matrix, their respective pixels, of which the number is equal to the matching length, may be extracted starting from a matching position according to scanning manners of the respective strings to form matched strings of the respective strings. According to the above example, split scanning may be performed on contents in scanning regions in the coding block corresponding to different formats according to different scanning orders.

According to the embodiment provided by the present disclosure, when the coding block to be coded in the image is coded, the scanning manner parameter of the coding block may be determined according to the characteristic parameter extracted from the coding block. The scanning manner parameter may include at least one of: the region indication parameter used for indicating that the coding block is partitioned into one or more scanning regions and the scanning indication parameter used for indicating the scanning order for scanning the coding block. The coding block in the image may be scanned according to the determined scanning manner parameter, and the predicted values of part or all of the pixels in the coding block may be determined. Furthermore, the coding block may be coded according to the predicted values, and the coding result may be written into the bitstream. That is, scanning coding may be performed on the coding block by adopting the split scanning manner, and the coding result may be written into the video bitstream. In the embodiment, the coding block may be partitioned into smaller scanning regions to achieve the effect of improving the coding efficiency and further solve a problem of lower efficiency caused by scanning only in the fixed manner in a coding technology.

As an exemplary solution, the act of determining the scanning manner parameter of the coding block may include the following acts S1 and S2.

At act S1, a characteristic parameter of pixel samples in the coding block and/or pixel samples in an adjacent region of the coding block may be extracted.

At act S2, the scanning manner parameter of the coding block may be determined according to the characteristic parameter.

In an exemplary embodiment, the act of extracting the characteristic parameter of the pixel samples in the coding block and/or the pixel samples in the adjacent region of the coding block may include the following act S12. At act S12, a texture characteristic of the pixel samples in the coding block and/or the pixel samples in the adjacent region of the coding block may be extracted. In the embodiment, the characteristic parameter may include the texture characteristic. The act of determining the scanning manner parameter of the coding block according to the characteristic parameter may include the following act S22. At act S22, the scanning manner parameter of the coding block may be determined according to the texture characteristic. In an exemplary embodiment, the act of determining the scanning manner parameter of the coding block according to the texture characteristic may include, but not limited to: determining partitioning, indicated by the region indication parameter, of the coding block into one or more scanning regions and the scanning order, indicated by the scanning indication parameter, for scanning the coding block.

According to an embodiment provided by the present disclosure, a texture characteristic of image content of the coding block may be extracted, and an optimal scanning manner parameter may be determined based on a texture characteristic of the image, so that coding compression efficiency of the coding block may be further improved.

As an exemplary solution, the act of extracting the texture characteristic of the pixel samples in the coding block and/or the pixel samples in the adjacent region of the coding block may include the following acts S1 and S2.

At act S1, filtering processing may be performed on the pixel samples in the coding block and/or the pixel samples in the adjacent region of the coding block.

At act S2, the texture characteristic may be extracted according to a filtering processing result.

In an exemplary embodiment, the act of performing the filtering processing on the pixel samples in the coding block and/or the pixel samples in the adjacent region of the coding block may include the following act S12.

At act S12, edge detection filtering may be performed on the pixel samples in the coding block and/or the pixel samples in the adjacent region of the coding block.

In an exemplary embodiment, the edge detection filtering serves as one implementation means, and the embodiment has no limits on the implementation means for acquisition of the texture characteristic in the embodiment. Therefore, whether to partition the coding block into scanning regions or not may be determined according to edge information. Furthermore, the scanning order of the pixels in the scanning region may be determined according to the texture characteristic extracted from a detection result.

As an exemplary solution, the act of determining the scanning manner parameter of the coding block according to the texture characteristic may include the following act S1.

At act S1, the region indication parameter in the scanning manner parameter may be determined according to the texture characteristic to obtain the scanning region of the coding block. In the embodiment, the scanning region of the coding block may include at least one of the following conditions: the coding block may be determined as one scanning region, and the coding block may be partitioned into multiple scanning regions.

It should be noted that, in the embodiment, the coded scanning region may be determined by, but not limited to, judging whether the texture direction indicated by the texture characteristic is intersected with the boundary of the coding block or not. For example, the coding block may be partitioned into multiple scanning regions in the direction perpendicular to the boundary when the texture direction is intersected with the boundary of the coding block. Here, the partitioning directions of the multiple scanning regions may alternatively be determined according to, but not limited to, the texture characteristic (i.e. texture direction) of the image content in the coding block, for example, the multiple scanning regions may be consistent with the texture direction.

According to the embodiment provided by the present disclosure, the region indication parameter in the scanning manner parameter may be determined to implement split scanning of the coding block according to the texture characteristic, thereby ensuring that split scanning may be simultaneously performed on different scanning regions in a process of performing scanning coding on the coding block and achieve the effect of improving the coding efficiency.

As an optional solution, the act of determining the region indication parameter in the scanning manner parameter according to the texture characteristic to obtain the scanning region of the coding block may include the following acts S1 to S3.

At act S1, whether a texture direction indicated by the texture characteristic is intersected with a boundary of the coding block or not may be judged.

At act S2, when the texture direction is intersected with the boundary of the coding block, the coding block may be partitioned into multiple scanning regions in a horizontal or vertical direction by taking a position of an intersection of the texture direction and the boundary of the coding block as an origin.

At act S3, when the texture direction is not intersected with the boundary of the coding block, the coding block may be determined as one scanning region.

In an exemplary embodiment, the act of partitioning the coding block into the multiple scanning regions in the horizontal or vertical direction by taking the position of the intersection of the texture direction and the boundary of the coding block as the origin may include the following any one of the acts S22 and S24.

At act S22, when the texture direction is intersected with a horizontal boundary of the coding block, the coding block may be partitioned into multiple scanning regions in the vertical direction perpendicular to the horizontal boundary by taking a position of an intersection of the texture direction and the boundary of the coding block as an origin.

At act S24, when the texture direction is intersected with a vertical boundary of the coding block, the coding block may be partitioned into multiple scanning regions in the horizontal direction perpendicular to the vertical boundary by taking a position of an intersection of the texture direction and the boundary of the coding block as an origin.

It should be noted that, in the embodiment, for simplifying operations, split scanning may be performed on the coding block in, but not limited to, the horizontal or vertical direction. In addition, in the embodiment, the multiple scanning regions may also be determined according to, but not limited to, a practical texture direction of the image content in the coding block. That is, multiple parallel scanning regions may be partitioned in a direction consistent with the texture direction.

According to the embodiment provided by the present disclosure, the scanning region may be determined based on the judgment about whether the texture direction indicated by the texture characteristic is intersected with the boundary of the coding block or not. Not only may convenience for operation be ensured, but also the compression efficiency of the coding block may be further ensured.

As an exemplary solution, the act of determining the scanning manner parameter of the coding block according to the texture characteristic may include the following act S1.

At act S1, the scanning indication parameter in the scanning manner parameter may be set according to a texture direction indicated by the texture characteristic. The scanning indication parameter may indicate the scanning order of the pixels in the scanning region of the coding block.

In an exemplary embodiment, during multi-split scanning, different scanning regions may, but not limited to, adopt the same scanning order, and may alternatively adopt different mixed scanning orders. For example, FIG. 4 to FIG. 9 are schematic diagrams of multiple kinds of mixed scanning obtained by combining different scanning manners and different scanning orders.

According to the embodiment provided by the present disclosure, the scanning order of the pixels in the one or more scanning regions in the coding block may be set according to the texture direction, so that the scanning coding operations may be further simplified, and the coding efficiency may be ensured.

As an exemplary solution, the act of determining the scanning manner parameter of the coding block according to the characteristic parameter may include the following acts S1 to S3.

At act S1, correlation of the pixel samples in the scanning region of the coding block may be acquired. The correlation may include at least one of: row correlation and column correlation.

At act S2, the correlation of the pixel samples may be compared.

At act S3, the scanning order of the pixels in the scanning region of the coding block may be determined according to a comparison result.

In an exemplary embodiment, the act of determining the scanning order of the pixels in the scanning region of the coding block according to the comparison result may include the following act S32.

At act S32, a scanning order indicated by a maximum correlation in the comparison result may be set as the scanning order of the pixels in the scanning region.

It should be noted that the scanning order of the pixels in the scanning region may be determined according to, but not limited to, the maximum correlation in the row correlation and/or column correlation of the pixels in the scanning region. Here, the embodiment has no limits on an acquisition manner for the correlation in the embodiment.

According to the embodiment provided by the present disclosure, corresponding scanning order may be set for the scanning region, thereby implementing adoption of diversified scanning orders for the coding block to ensure maximization of the coding efficiency.

As an exemplary solution, the act of determining the predicted values of part or all of the pixels in the coding block according to the scanning manner parameter may include the following acts S1 and S2.

At act S1, reference values of the pixel samples of part or all of the pixels in the coding block may be determined as the predicted values.

At act S2, combinations of the pixel samples of part or all of the pixels in the coding block may be determined according to the scanning manner parameter, and combinations of the reference values corresponding to the combinations of the pixel samples may be determined as the predicted values.

In an exemplary embodiment, the combinations of the pixel samples may include, but not limited to, multiple combinations, formed by different scanning regions, of the pixel samples. The reference values may also be called as reference samples.

It should be noted that, in the embodiment, coding the coding block may refer to performing compressed coding on the original sampling values (also called as the pixel values in the embodiment) of the pixels in the coding block, that is, the original sampling values (i.e. the pixel values) of the pixels in the coding block may be mapped (destructively) into a series of parameters, and these parameters indicate the prediction method adopted for the coding block, the construction method for the predicted values and the predicted differences. In the embodiment of the present disclosure, since the split scanning manner may be adopted to perform coding scanning on the coding block, it may be suggested to code the information identifying the split scanning manner used for the coding block, i.e. the scanning manner parameter, in the bitstream.

That is, the two-dimensional pixels in the coding block may be partitioned into some columns of strings formed by the pixels continuously arranged according to the scanning order according to the scanning manner parameter, and these strings may be continuously arranged into the two-dimensional pixel arrangement in the coding block according to the scanning order. Each string has its own matched string (i.e. predicted value), and the matched string of each string may be continuously arranged into the predicted values of the two-dimensional pixels in the coding block according to the scanning order. The act of writing into the bitstream may be implemented in the following manner. A reference numerical value represented by an ordinary decimal numeral system may be converted into a binary symbol string represented by bits 0 and 1, the binary symbol string may be directly used as a bitstream, the binary symbol string may alternatively be mapped into another new binary symbol string by virtue of, for example, an arithmetic entropy coding method, and the new binary symbol string may be determined as the bitstream. The embodiment has no limits for the specific manner adopted.

According to the embodiment provided by the present disclosure, at the same time when split scanning is performed on the coding block, split coding may be performed on the coding block according to split contents, thereby further achieving the effect of improving the compression efficiency in the coding process.

As an exemplary solution, the act of writing the coding result into the bitstream may include the following act S1.

At act S1, the coding result and the scanning manner parameter may be written into one or more data units in the bitstream according to a predetermined format. The data units may include at least one of: a video parameter set, a sequence parameter set, a picture parameter set, a slice header, a CTU, a CU and a data unit where the coding block is located.

It should be noted that coding may be configured in, but not limited to, at least one of the following manners: configuration with a coder, configuration according to a setting of a coder optimization module and direct configuration in the coder optimization module with a fixed precoding manner. The coder may adopt a method as follows. When a split scanning manner of vertical splitting is used for an upper adjacent block and a vertical edge of the upper adjacent block is intersected with a lower boundary of the upper adjacent block, it may be directly deduced that the current block adopts the same split scanning manner with the upper adjacent block, that is, a precoding process for the current coding block is eliminated, so that coding time may be saved, and the coding efficiency may be improved.

From the above descriptions about the implementation modes, those skilled in the art may clearly learn about that the method of the embodiment may be implemented in a manner of combining software and a necessary universal hardware platform, and of course, may also be implemented through hardware, but the former one is a better implementation mode under many conditions. Based on such an understanding, the technical solutions of the present disclosure substantially or parts making contributions to the related technology may be embodied in form of software product, and the computer software product is stored in a storage medium (such as a Read Only Memory (ROM)/Random Access Memory (RAM), a magnetic disk and an optical disk), including a plurality of instructions configured to enable a piece of terminal equipment (which may be a mobile phone, a computer, a server, network equipment or the like) to execute the method of each embodiment of the present disclosure.

Second Embodiment

Figure 10:
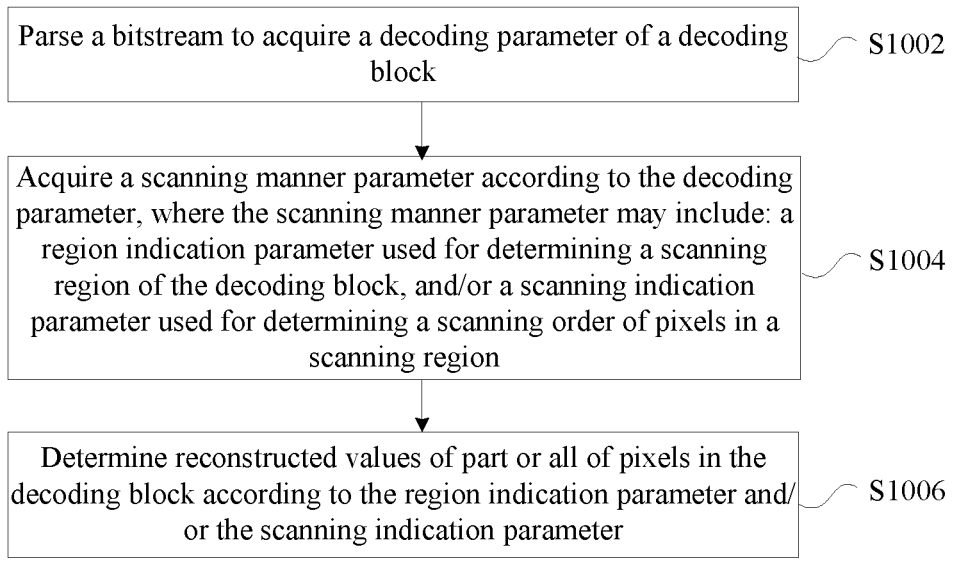
FIG. 10 is a flowchart of an exemplary image decoding method according to an embodiment of the present disclosure.

The embodiment provides an image decoding method. FIG. 10 is a flowchart of an exemplary image decoding method according to an embodiment of the present disclosure. As shown in FIG. 10, the flow includes the following acts S1002 to S1006.

At act S1002, a bitstream may be parsed to acquire a decoding parameter of a decoding block.

At act S1004, a scanning manner parameter may be acquired according to the decoding parameter. The scanning manner parameter may include: a region indication parameter used for determining a scanning region of the decoding block, and/or a scanning indication parameter used for determining a scanning order of pixels in a scanning region.

At act S1006, reconstructed values of part or all of pixels in the decoding block may be determined according to the region indication parameter and/or the scanning indication parameter.

In an exemplary embodiment, the image decoding method may be applied to, but not limited to, a video image decoding process, and for example, may be applied to, but not limited to, a packed-format image decoding or component planar-format image decoding process. In a process of decoding a video image, split scanning is performed on a decoding block to be decoded according to an indication of a determined scanning manner parameter. That is, the decoding block may be split into K scanning regions for scanning according to a corresponding scanning order, so as to solve a problem of lower efficiency caused by adoption of a fixed scanning manner for row (or column) scanning and further achieve an effect of improving decompression efficiency in the image decoding process. In some embodiment, K may meet the following condition: 1<K<16. K=1 represents 1-split, i.e. non-split or called as single-split. K>1 represents multi-split, i.e. split scanning.

In the embodiment, when the decoding block to be decoded is decoded, the bitstream may be parsed to acquire the decoding parameter of the decoding block to be decoded, and the scanning manner parameter of the decoding block may be determined according to the decoding parameter. The scanning manner parameter may include the region indication parameter used for determining the scanning region of the decoding block and/or the scanning indication parameter used for determining the scanning order of the pixels in the scanning region. The reconstructed values of part or all of the pixels in the decoding block may be determined according to the scanning manner parameter and/or the scanning indication parameter. That is, scanning coding may be performed on the decoding block by adopting a split scanning manner, thereby partitioning the decoding block into smaller scanning regions to achieve the effect of improving decoding efficiency.

In the embodiment, it should be noted that "pixel sample", "pixel value", "sample", "indexed pixel" and "pixel index" are synonyms, and whether these terms represent a "pixel" or "a pixel component" or an "indexed pixel", or represent any one of the three should be clear to a skilled in the art based on the context. If this information cannot be clearly determined based on the context, any one of the three is represented.

In addition, the decoding block may be a region formed by a plurality of pixel values. A shape of the decoding block may include, but not limited to, at least one of the following shapes: a rectangle, a square, a parallelogram, a trapezoid, a polygon, a round, an ellipse or any other shape. Herein, the rectangle may also include a rectangle of which a width or height is one pixel, that is, a rectangle which is degenerated into a line (i.e. a line segment or a line shape). In the embodiment, in one image, each decoding block may have a different shape and size. In addition, in one image, some or all of decoding blocks may have mutually overlapped parts, or none of the decoding blocks may be overlapped. Furthermore, a decoding block may be formed by "pixels", or by "components of the pixels", or by "indexed pixels", or by mixture of the three, and may alternatively be formed by mixture of any two of the three, which will not be limited in the embodiment. From the point of video image decoding, a decoding block may refer to a region which is decoded in an image, for example, including, but not limited to, at least one of: an LCU, a CTU, a decoding unit, a sub-region of the decoding unit, a PU or a TU.

In an exemplary embodiment, the scanning order of the pixels in the scanning region may include at least one of: a horizontal Z-shaped scanning order, a vertical Z-shaped scanning order, a horizontal arched scanning order, a vertical arched scanning order, a raster scanning order, a Zigzag scanning order, a saw-toothed scanning order, a diagonal Z-shaped scanning order and a diagonal arched scanning order.

In an exemplary embodiment, a scanning manner may include, but not limited to, at least one of: 2-split, 4-split, 8-split and 16-split. In a multi-split process, scanning orders of different scanning regions may be the same, or may be different, which will not be limited in the embodiment.

For example, FIG. 3 shows four kinds of optional scanning indicated by the scanning manner parameter: 1) horizontal Z-shaped 2-split scanning is performed on the decoding block; 2) horizontal Z-shaped 4-split scanning is performed on the decoding block; 3) vertical Z-shaped 2-split scanning is performed on the decoding block; and 4) vertical Z-shaped 4-split scanning is performed on the decoding block. For another example, FIG. 4 to FIG. 9 show multiple kinds of optional scanning obtained by combining different scanning manners and different scanning orders and indicated by the scanning manner parameter.

In an exemplary embodiment, a manner of acquiring the scanning manner parameter according to the decoding parameter may include at least one of:

1) acquiring the region indication parameter and/or scanning indication parameter in the scanning manner parameter from the decoding parameter;

2) extracting a characteristic parameter of pixel samples in an adjacent region of the decoding block, and determining the scanning manner parameter of the decoding block according to the texture characteristic; in the embodiment, the characteristic parameter may include a texture characteristic;

3) acquiring a mode indication parameter used for indicating a coding mode according to the decoding parameter, and acquiring the scanning manner parameter from the mode indication parameter.

It should be noted that a manner of, after the bitstream is parsed to acquire the decoding parameter directly coded in the bitstream, acquiring the scanning manner parameter according to the decoding parameter may include at least one of: (1) parsing the bitstream to directly obtain the region indication parameter and/or scanning indication parameter in the scanning manner parameter; (2) obtaining the region indication parameter and/or scanning indication parameter in the scanning manner parameter in a deduction manner according to the characteristic parameter of the pixel samples in the adjacent region of the decoding block; and (3) adopting a "fixed binding" form for the scanning manner and some coding modes, namely acquiring the mode indication parameter used for indicating the coding mode according to the decoding parameter, and when a mode marker is parsed from the mode indication parameter, using a region indication parameter and/or scanning indication parameter preset for the mode.

In addition, in the embodiment, a pixel may indicate a minimum display unit of an image, and there may be one (such as monochromic grayscale image) or three (such as RGB and YUV) effective sampling values, i.e. pixel samples, at one pixel position. In the embodiment, pixels may be used to describe positions, and pixel samples may be used to describe and process sampling values at pixel positions.

Furthermore, in the manner 2), the decoded scanning region may be determined by, but not limited to, judging whether a texture direction indicated by the texture characteristic is intersected with a boundary of the decoding block or not. For example, the decoding block may be partitioned into multiple scanning regions in a direction perpendicular to the boundary when the texture direction is intersected with the boundary of the coding block.

In an exemplary embodiment, a manner of determining the reconstructed values of part or all of the pixels in the decoding block according to the region indication parameter and/or the scanning indication parameter may include:

1) acquiring predicted values of part or all of the pixels in the decoding block, and determining the predicted values as the reconstructed values; or 2) acquiring predicted values and corresponding predicted difference values of part or all of the pixels in the decoding block, and determining sum values or difference values between the predicted values and the predicted difference values as the reconstructed values.

In an exemplary embodiment, the act of determining the predicted values of part or all of the pixels in the decoding block may include: determining reference values of the pixel samples of part or all of the pixels in the decoding block, and determining the reference values as the predicted values; and determining combinations of the pixel samples of part or all of the pixels in the decoding block according to the scanning manner parameter, and determining combinations of the reference values corresponding to the combinations of the pixel samples as the predicted values.

In an exemplary embodiment, the act of parsing the bitstream to acquire the decoding parameter of the decoding block may include: acquiring the decoding parameter from one or more data units in the bitstream. The data units may include at least one of: a video parameter set, a sequence parameter set, a picture parameter set, a slice header, a CTU, a CU and a data unit where the decoding block is located.

Descriptions will specifically be made in combination with the following example. For a bitstream obtained by coding a coding block adopting string matching coding, a decoding block may be partitioned into different scanning regions in a decoding process, and split scanning corresponding to a coding process may be used for each scanning region. For example, if elements in a two-dimensional matrix are arranged into a one-dimensional vector in the coding process according to an indication of the scanning manner parameter, the decoding process may be considered as an inverse process of coding, that is, elements in a one-dimensional vector may be arranged into a two-dimensional matrix. A read-write address control method may be adopted for practical code implementation. For example, two-dimensional pixels are as follows:

[ABCD
EFGH
IJKL
MNOP].

Then, the two-dimensional pixels may be converted into one-dimensional arrangement [ABCDHGFEIJKLPONM] according to "arched 4-split scanning" indicated by the scanning manner parameter corresponding to the scanning manner parameter used for the coding process, and a pseudo code for implementation may be as follows:

```
int position[4][4]={0, 1, 2, 3
7, 6, 5, 4,
8, 9, 10, 11,
15, 14, 13, 12};
for (h=0; h<4; h++)
    for (w=0; w<4; w++)
        1D_array[position[h][w]]=2D_array[h][w].
```

According to the embodiment provided by the present disclosure, the bitstream may be parsed to acquire the decoding parameter of the decoding block, and the scanning manner parameter may be acquired according to the decoding parameter. The scanning manner parameter may include the region indication parameter configured to the scanning region of the decoding block and/or the scanning indication parameter used for determining the scanning order of the pixels in the scanning region. The reconstructed values of part or all of the pixels in the decoding block may be determined according to the region indication parameter and/or the scanning indication parameter. That is, scanning decoding may be performed on the decoding block by adopting the split scanning manner, thereby partitioning the decoding block into smaller scanning regions to achieve the effect of improving the decoding efficiency and further solve a problem of lower efficiency caused by scanning only in the fixed manner in a decoding technology.

As an exemplary solution, the act of acquiring the scanning manner parameter according to the decoding parameter may include the following act S1.

At act S1, the region indication parameter and/or scanning indication parameter in the scanning manner parameter may be acquired from the decoding parameter to obtain the scanning region of the decoding block. The scanning region of the decoding block may include at least one of the following conditions: the decoding block is determined as one scanning region, and the decoding block is partitioned into multiple scanning regions.

In an exemplary embodiment, the decoding block may be determined as a single-split scanning region, and the decoding block may alternatively be partitioned into multi-split scanning regions.

It should be noted that, in the embodiment, the decoded scanning region may be determined by, but not limited to, judging whether the texture direction indicated by the texture characteristic in the characteristic parameter of the pixel samples in the adjacent region of the decoding block is intersected with the boundary of the decoding block or not. For example, the decoding block may be partitioned into multiple scanning regions in the direction perpendicular to the boundary when the texture direction is intersected with the boundary of the decoding block. Here, the partitioning directions of the multiple scanning regions may alternatively be determined according to, but not limited to, the texture characteristic (i.e. texture direction) of image content in the decoding block, for example, the multiple scanning regions may be consistent with the texture direction.

In an exemplary embodiment, the decoding scanning order in the decoding process may be a preset scanning order, and may alternatively be the scanning order indicated by the scanning manner parameter. The embodiment has no limits for the scanning order.

According to the embodiment provided by the present disclosure, split scanning may be performed on the decoding block according to the texture characteristic, thereby ensuring that split scanning may be simultaneously performed on different scanning regions in a process of performing scanning decoding on the decoding block and achieve the effect of improving the decoding efficiency. In addition, corresponding scanning order may be set for the scanning region, thereby implementing adoption of diversified scanning orders for the decoding block to ensure maximization of the decoding efficiency.

As an exemplary solution, the act of acquiring the scanning manner parameter according to the decoding parameter may include the following acts S1 and S2.

At act S1, a characteristic parameter of pixel samples in an adjacent region of the decoding block may be extracted. In the embodiment, the characteristic parameter may include a texture characteristic.

At act S2, the scanning manner parameter of the decoding block may be determined according to the texture characteristic.

According to the embodiment provided by the present disclosure, a texture characteristic of the image content of the coding block may be extracted, and an optimal scanning manner parameter may be determined based on a texture characteristic of the image, so that decoding decompression efficiency of the decoding block is further improved.

As an exemplary solution, the act of extracting the characteristic parameter of the adjacent region of the decoding block may include the following acts S1 and S2.

At act S1, filtering processing may be performed on reconstructed values of decoded pixels in the adjacent region of the decoding block; and At act S2, the texture characteristic may be extracted according to a filtering processing result.

In an exemplary embodiment, the act of performing the filtering processing on the reconstructed values of the decoded pixels in the adjacent region of the decoding block may include the following act S12.

At act S12, edge detection filtering may be performed on the reconstructed values of the decoded pixels in the adjacent region of the decoding block.

In an exemplary embodiment, the edge detection filtering serves as one implementation means, and the embodiment has no limits on the implementation means for acquisition of the texture characteristic in the embodiment. Therefore, whether to partition the decoding block into scanning regions or not may be determined according to edge information. Furthermore, the scanning order of the pixels in the scanning region may be determined according to the texture characteristic extracted from a detection result.

As an exemplary solution, the act of determining the scanning manner parameter of the decoding block according to the texture characteristic may include the following acts S1 to S3.

At act S1, whether a texture direction indicated by the texture characteristic is intersected with a boundary of the decoding block or not may be judged.

At act S2, when the texture direction is intersected with the boundary of the decoding block, the decoding block may be partitioned into multiple scanning regions in a horizontal or vertical direction by taking a position of an intersection of the texture direction and the boundary of the coding block as an origin.

At act S3, when the texture direction is not intersected with the boundary of the decoding block, the decoding block may be determined as one scanning region.

In an exemplary embodiment, the act of partitioning the decoding block into the multiple scanning regions in the horizontal or vertical direction by taking the position of the intersection of the texture direction and the boundary of the decoding block as the origin may include any one of the following acts S22 and S24.

At act S22, when the texture direction is intersected with a horizontal boundary of the decoding block, the decoding block may be partitioned into multiple scanning regions in the vertical direction perpendicular to the horizontal boundary by taking a position of an intersection of the texture direction and the boundary of the decoding block as an origin.

At act S24, when the texture direction is intersected with a vertical boundary of the decoding block, the decoding block may be partitioned into multiple scanning regions in the horizontal direction perpendicular to the vertical boundary by taking a position of an intersection of the texture direction and the boundary of the decoding block as an origin.

It should be noted that, in the embodiment, for simplifying operations, split scanning may be performed on the decoding block in, but not limited to, the horizontal or vertical direction. In addition, in the embodiment, the multiple scanning regions may also be determined according to, but not limited to, a practical texture direction of the image content in the decoding block. That is, multiple parallel scanning regions may be partitioned in a direction consistent with the texture direction.

According to the embodiment provided by the present disclosure, the scanning region may be determined based on the judgment about whether the texture direction indicated by the texture characteristic is intersected with the boundary of the decoding block or not. Not only may convenience for operation be ensured, but also the decompression efficiency of the decoding block is further ensured.

As an exemplary solution, the act of determining the scanning manner parameter of the decoding block according to the texture characteristic may include the following act S1.

At act S1, the scanning order of the pixels in the scanning region of the decoding block may be set according to a texture direction indicated by the texture characteristic.

In an exemplary embodiment, during multi-split scanning, different scanning regions may, but not limited to, adopt the same scanning order, and may alternatively adopt different mixed scanning orders. For example, FIG. 4 to FIG. 9 are schematic diagrams of multiple kinds of mixed scanning obtained by combining different scanning manners and different scanning orders.

According to the embodiment provided by the present disclosure, the scanning order of the pixels in the one or more scanning regions in the decoding block is set according to the texture direction, so that the scanning decoding operations may be further simplified, and the decoding efficiency may be ensured.

As an exemplary solution, the act of acquiring the scanning manner parameter according to the decoding parameter may include the following acts S1 and S2.

At act S1, a mode indication parameter used for indicating a coding mode may be acquired according to the decoding parameter.

At act S2, the scanning manner parameter may be acquired from the mode indication parameter.

In an exemplary embodiment, a "fixed binding" form may be adopted for the scanning manner and some coding modes, that is, the mode indication parameter used for indicating the coding mode may be acquired according to the decoding parameter, and the mode marker may be parsed from the mode indication parameter by using the region indication parameter and/or scanning indication parameter preset for the mode.

As an exemplary solution, the act of determining the reconstructed values of part or all of the pixels in the decoding block according to the region indication parameter and/or the scanning indication parameter may include any one of the following acts S1 and S2.

At act S1, predicted values of part or all of the pixels in the decoding block may be acquired, and the predicted values may be determined as the reconstructed values.

At act S2, predicted values and corresponding predicted difference values of part or all of the pixels in the decoding block may be acquired, and sum values or difference values between the predicted values and the predicted difference values may be determined as the reconstructed values.

In an exemplary embodiment, the combinations of the pixel samples may include, but not limited to, multiple combinations, formed by different scanning regions, of the pixel samples. The reference values may also be called as reference samples.

In an exemplary embodiment, the act of acquiring the predicted values of part or all of the pixels in the decoding block may include the following acts S12 and S14.

At act S12, reference values of pixel samples of part or all of the pixels in the decoding block may be determined as the predicted values.

At act S14, combinations of the pixel samples of part or all of the pixels in the decoding block may be determined according to the scanning manner parameter, and combinations of the reference values corresponding to the combinations of the samples may be determined as the predicted values.

That is, the decoding process may be, but not limited to the inverse process of the coding process. For example, in a process of determining the reconstructed values, the bitstream may be parsed to obtain the predicted differences (there may be no predicted differences transmitted in the bitstream, and in this situation, the predicted differences are considered to be 0), and the reconstructed values may be equal to the sums of the predicted values and the predicted differences.

It should be noted that a destructive coding manner may be adopted in the embodiment, so that the predicted differences may be, but not limited to, directly acquired after being parsed from the bitstream, to ensure accuracy of the reconstructed values.

According to the embodiment provided by the present disclosure, at the same time when split scanning is performed on the decoding block, split decoding may be performed on the decoding block according to split contents, thereby further achieving the effect of improving the decompression efficiency in the decoding process.

As an exemplary solution, the act of parsing the bitstream to acquire the decoding parameter of the decoding block may include the following act S1.

At act S1, the decoding parameter may be acquired from one or more data units in the bitstream. The data units may include at least one of: a video parameter set, a sequence parameter set, a picture parameter set, a slice header, a CTU, a CU and a data unit where the decoding block is located.

It should be noted that decoding may be configured in, but not limited to, at least one of the following manners: configuration with a decoder, configuration according to a setting of a decoder optimization module and direct configuration in the decoder optimization module with a fixed precoding manner. The decoder may adopt a method as follows: when a split scanning manner of vertical splitting is used for an upper adjacent block and a vertical edge of the upper adjacent block is intersected with a lower boundary of the upper adjacent block, it may be directly deduced that the current block adopts the same split scanning manner with the upper adjacent block, that is, a pre-decoding process for the current decoding block is eliminated, so that decoding time may be saved, and the decoding efficiency may be improved.

From the above descriptions about the implementation modes, those skilled in the art may clearly learn about that the method of the embodiment may be implemented in a manner of combining software and a necessary universal hardware platform, and of course, may also be implemented through hardware, but the former one is a better implementation mode under many conditions. Based on such an understanding, the technical solutions of the present disclosure substantially or parts making contributions to the related technology may be embodied in form of software product, and the computer software product is stored in a storage medium (such as a ROM/RAM, a magnetic disk and an optical disk), including a plurality of instructions configured to enable a piece of terminal equipment (which may be a mobile phone, a computer, a server, network equipment or the like) to execute the method of each embodiment of the present disclosure.

Third Embodiment

The embodiment provides an image coding apparatus. The apparatus may be configured to implement the above-mentioned embodiment and preferred implementation modes, and what has been described will not be elaborated. For example, term "module", used below, may be a combination of software and/or hardware capable of realizing a preset function. Although the apparatus described in the following embodiment is preferably implemented with software, implementation with hardware or a combination of the software and the hardware is also possible and conceivable.

Figure 11:
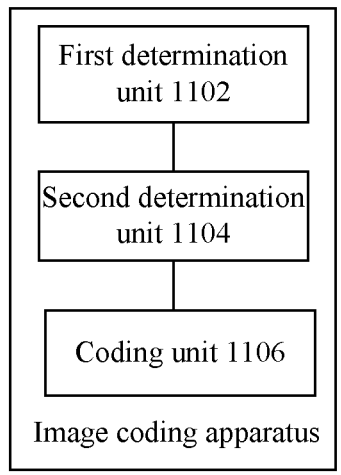
FIG. 11 is a schematic diagram of an exemplary image coding apparatus according to an embodiment of the present disclosure.

The embodiment provides an image coding apparatus. FIG. 11 is a schematic diagram of an exemplary image coding apparatus according to an embodiment of the present disclosure. As shown in FIG. 11, the apparatus includes a first determination unit 1102, a second determination unit 1104 and a coding unit 1106.

1) The first determination unit 1102 may be configured to determine a scanning manner parameter of a coding block. The scanning manner parameter may include at least one of: a region indication parameter used for determining a scanning region of the coding block and a scanning indication parameter used for determining a scanning order of pixels in a scanning region of the coding block.

2) The second determination unit 1104 may be configured to determine predicted values of part or all of pixels in the coding block according to the scanning manner parameter.

3) The coding unit 1106 may be configured to code the coding block according to the predicted values, and write a coding result into a bitstream.

In an exemplary embodiment, the image coding apparatus may be applied to, but not limited to, a video image coding process, and for example, may be applied to, but not limited to, a packed-format image coding or component planar-format image coding process. In a process of coding a video image, split scanning may be performed on a coding block to be coded according to an indication of a determined scanning manner parameter, and the coding block may be written into a video bitstream. That is, the coding block may be split into K scanning regions for scanning according to a corresponding scanning order, so as to solve a problem of lower efficiency caused by adoption of a fixed scanning manner for row (or column) scanning and further achieve an effect of improving compression efficiency in the image coding process. In some embodiment, K may meet the following condition: 1<K<16. K=1 represents 1-split, i.e. non-split or called as single-split. K>1 represents multi-split, i.e. split scanning.

In the embodiment, the scanning manner parameter of the coding block may be determined when the coding block to be coded is coded. The scanning manner parameter may include at least one of: the region indication parameter used for determining the scanning region of the coding block and the scanning indication parameter used for determining the scanning order of the pixels in the scanning region of the coding block. The predicted values of part or all of the pixels in the coding block may be determined according to the determined scanning manner parameter. The coding block may be coded according to the predicted values, and the coding result may be written into the bitstream. That is, scanning coding may be performed on the coding block by adopting a split scanning manner, and the coding result may be written into the video bitstream. In the embodiment, the coding block may be partitioned into smaller scanning regions to achieve the effect of improving coding efficiency.

In the embodiment, it should be noted that "pixel sample", "pixel value", "sample", "indexed pixel" and "pixel index" are synonyms, and whether these terms represent a "pixel" or "a pixel component" or an "indexed pixel", or represent any one of the three should be clear to a skilled in the art based on the context. If this information cannot be clearly determined based on the context, any one of the three is represented.

In addition, the coding block may be a region formed by a plurality of pixel values. A shape of the coding block may include, but not limited to, at least one of the following shapes: a rectangle, a square, a parallelogram, a trapezoid, a polygon, a round, an ellipse or any other shape. Herein, the rectangle may also include a rectangle of which a width or height is one pixel, that is, a rectangle which is degenerated into a line (i.e. a line segment or a line shape). In the embodiment, in one image, each coding block may have a different shape and size. In addition, in one image, some or all of coding blocks may have mutually overlapped parts, or none of the coding blocks may be overlapped. Furthermore, one coding block may be formed by "pixels", or by "components of the pixels", or by "indexed pixels", or by mixture of the three, and may alternatively be formed by mixture of any two of the three, which will not be limited in the embodiment. From the point of video image coding, a coding block may refer to a region which is coded in an image, for example, including, but not limited to, at least one of: an LCU, a CTU, a CU, a sub-region of the CU, a PU or a TU.

In an exemplary embodiment, the scanning order of the pixels in the scanning region may include at least one of: a horizontal Z-shaped scanning order, a vertical Z-shaped scanning order, a horizontal arched scanning order, a vertical arched scanning order, a raster scanning order, a Zigzag scanning order, a saw-toothed scanning order, a diagonal Z-shaped scanning order and a diagonal arched scanning order.

In an exemplary embodiment, a scanning manner may include, but not limited to, at least one of: 2-split, 4-split, 8-split and 16-split. In a multi-split process, scanning orders of different scanning regions may be the same, or may be different, which will not be limited in the embodiment.

For example, FIG. 3 shows four kinds of optional scanning indicated by the scanning manner parameter: 1) horizontal Z-shaped 2-split scanning performed on the coding block; 2) horizontal Z-shaped 4-split scanning performed on the coding block; 3) vertical Z-shaped 2-split scanning performed on the coding block; and 4) vertical Z-shaped 4-split scanning performed on the coding block. For another example, FIG. 4 to FIG. 9 show multiple kinds of optional scanning obtained by combining different scanning manners and different scanning orders and indicated by the scanning manner parameter.

In an exemplary embodiment, the act of determining the scanning manner parameter of the coding block may be achieved in one of the following manners.

1) A characteristic parameter of pixel samples in the coding block and/or pixel samples in an adjacent region of the coding block may be extracted. The scanning manner parameter of the coding block may be determined according to the characteristic parameter.

2) A scanning manner parameter capable of achieving optimal coding efficiency of the coding block in candidate scanning manner parameters of the coding block may be set as the scanning indication parameter of the coding block.

Optionally, in the manner 1) of the embodiment, a texture characteristic, but not limited thereto, of the pixel samples in the coding block and/or the pixel samples in the adjacent region of the coding block may be extracted, so as to implement determination of the scanning manner parameter according to the texture characteristic. In the embodiment, the characteristic parameter may include the texture characteristic. In the manner 2) of the embodiment, the candidate scanning manner parameters may represent, but not limited to, all optional scanning manner parameters, and coding efficiency of these scanning manner parameters in a coding process may be sequentially compared, so as to set the scanning manner parameter capable of achieving the optimal coding efficiency as the final scanning manner parameter of the image coding block. For example, maximum coding efficiency may be determined by virtue of an existing rate distortion optimization method.

It should be noted that, in the embodiment, a pixel may indicate a minimum display unit of an image, and there may be one (such as monochromic grayscale image) or three (such as RGB and YUV) effective sampling values, i.e. pixel samples, at one pixel position. In the embodiment, pixels may be used to describe positions, and pixel samples may be used to describe and process sampling values at pixel positions.

In an exemplary embodiment, the act of determining the scanning manner parameter of the coding block according to the texture characteristic may include the following acts.

1) The region indication parameter in the scanning manner parameter may be determined according to the texture characteristic to obtain the scanning region of the coding block. In the embodiment, the scanning region of the coding block may include at least one of the following conditions: the coding block may be determined as one scanning region, and the coding block may be partitioned into multiple scanning regions.

It should be noted that, in the embodiment, the coded scanning region may be determined by, but not limited to, judging whether a texture direction indicated by the texture characteristic is intersected with a boundary of the coding block or not. For example, the coding block may be partitioned into multiple scanning regions in a direction perpendicular to the boundary when the texture direction is intersected with the boundary of the coding block. Here, partitioning directions of the multiple scanning regions may alternatively be determined according to, but not limited to, the texture characteristic (i.e. texture direction) of image content in the coding block, for example, partitioning directions of the multiple scanning regions may be consistent with the texture direction.

2) The scanning indication parameter in the scanning manner parameter may be set according to a texture direction indicated by the texture characteristic. The scanning indication parameter may indicate the scanning order of the pixels in the scanning region of the coding block.

In an exemplary embodiment, the scanning order may include, but not limited to, at least one of the following conditions:

(1) the texture direction may be set as the scanning order of the pixels in the scanning region of the coding block; and (2) correlation of the pixel samples in the scanning region of the coding block may be acquired, the correlation of the pixel samples may be compared, and the scanning order of the pixels in the scanning region of the coding block may be determined according to a comparison result.

It should be noted that, in the manner 2) of the embodiment, the correlation may include, but not limited to, at least one of: row correlation and column correlation. The scanning order may be set in, but not limited to, a manner of setting a scanning order indicated by a maximum correlation in the comparison result as the scanning order of the pixels in the scanning region.

In an exemplary embodiment, the act of determining the predicted values of part or all of the pixels in the coding block may include the following acts. Reference values of the pixel samples of part or all of the pixels in the coding block may be determined as the predicted values. Combinations of the pixel samples of part or all of the pixels in the coding block may be determined according to the scanning manner parameter, and combinations of the reference values corresponding to the combinations of the pixel samples may be determined as the predicted values.

In an exemplary embodiment, the act of writing the coding result into the bitstream may include writing the coding result and the scanning manner parameter into one or more data units in the bitstream according to a predetermined format. The data units may include at least one of: a video parameter set, a sequence parameter set, a picture parameter set, a slice header, a CTU, a CU and a data unit where the coding block is located.

It should be noted that, in the embodiment, coding the coding block may refer to performing compressed coding on original sampling values (also called as pixel values in the embodiment) of the pixels in the coding block, that is, the original sampling values (i.e. the pixel values) of the pixels in the coding block may be mapped (destructively) into a series of parameters, and these parameters indicate a prediction method adopted for the coding block, a construction method for the predicted values and predicted differences. In the embodiment of the present disclosure, since the split scanning manner may be adopted to perform coding scanning on the coding block, it may be suggested to code information identifying the split scanning manner used for the coding block, i.e. the scanning manner parameter, in the bitstream. The reference values may also be called as reference samples.

That is, two-dimensional pixels in the coding block may be partitioned into some columns of strings formed by the pixels continuously arranged according to the scanning order according to the scanning manner parameter, and these strings may be continuously arranged into two-dimensional pixel arrangement in the coding block according to the scanning order. Each string has its own matched string (i.e. predicted value), and the matched string of each string may be continuously arranged into the predicted values of the two-dimensional pixels in the coding block according to the scanning order. The act of writing into the bitstream may be implemented in the following manner. A reference numerical value represented by an ordinary decimal numeral system may be converted into a binary symbol string represented by bits 0 and 1, the binary symbol string may be directly used as a bitstream, the binary symbol string may alternatively be mapped into another new binary symbol string by virtue of, for example, an arithmetic entropy coding method, and the new binary symbol string may be determined as the bitstream. The embodiment has no limits for the specific manner adopted.

Descriptions will specifically be made in combination with the following example. A two-dimensional matrix in the coding block to be coded of the image is as follows:

[ABCD
EFGH
IJKL
MNOP].

It should be noted that, if scanning is performed according to an existing scanning manner, the two-dimensional matrix may be arranged into one-dimensional arrangement such as [ABCDEFGHIJKLMNOP], [AEIMBFJNCGKODHLP], [ABCDHGFEIJKLPONM] and [AEIMNJFBCGKOPLHD]. That is, the existing fixed scanning manner may only perform the scanning according to the above four kinds of scanning arrangement.

While in the embodiment, the pixels which are freely continuously arranged may form strings according to a one-dimensional arrangement order. Taking the one-dimensional arrangement is [ABCDHGFEIJKLPONM] as an example, the one-dimensional arrangement order may be partitioned into four 4 strings and positions of the four strings in the two-dimensional matrix may be as follows: string 1 [AB] (bold), string 2 [CDHGF] (underlined), string 3 [EIJK] (italic) and string 4 [LPONM] (in a normal format):

[ABCD
*E*FGH
*IJK*L
MNOP].

In a practical matched string expression process, it is only needed to sequentially point out four pieces of expression information [matching position 1, matching length=2], [matching position 2, matching length=5], [matching position 3, matching length=4] and [matching position 4, matching length=5]. During conformal matching, for strings marked as different formats in the above matrix, their respective pixels, of which the number is equal to the matching length, may be extracted starting from a matching position according to scanning manners of the respective strings to form matched strings of the respective strings. According to the above example, split scanning may be performed on contents in scanning regions in the coding block corresponding to different formats according to different scanning orders.

According to the embodiment provided by the present disclosure, when the coding block to be coded in the image is coded, the scanning manner parameter of the coding block may be determined according to the characteristic parameter extracted from the coding block. The scanning manner parameter may include at least one of: the region indication parameter used for indicating that the coding block is partitioned into one or more scanning regions and the scanning indication parameter used for indicating the scanning order for scanning the coding block. The coding block in the image may be scanned according to the determined scanning manner parameter, and the predicted values of part or all of the pixels in the coding block may be determined. Furthermore, the coding block may be coded according to the predicted values, and the coding result may be written into the bitstream. That is, scanning coding may be performed on the coding block by adopting the split scanning manner, and the coding result may be written into the video bitstream. In the embodiment, the coding block may be partitioned into smaller scanning regions to achieve the effect of improving the coding efficiency and further solve a problem of lower efficiency caused by scanning only in the fixed manner in a coding technology.

As an exemplary solution, the first determination unit may include an extraction module and a first determination module.

1) The extraction module may be configured to extract a characteristic parameter of pixel samples in the coding block and/or pixel samples in an adjacent region of the coding block.

2) The first determination module may be configured to determine the scanning manner parameter of the coding block according to the characteristic parameter.

In an exemplary embodiment, the extraction module may include an extraction sub-module. The extraction sub-module may be configured to extract a texture characteristic of the pixel samples in the coding block and/or the pixel samples in the adjacent region of the coding block, where the characteristic parameter may include the texture characteristic. The first determination module may include a first determination sub-module. The first determination sub-module may be configured to determine the scanning manner parameter of the coding block according to the texture characteristic.

In an exemplary embodiment, the act of determining the scanning manner parameter of the coding block according to the texture characteristic may include, but not limited to: determining partitioning, indicated by the region indication parameter, of the coding block into one or more scanning regions and the scanning order, indicated by the scanning indication parameter, for scanning the coding block.

According to the embodiment provided by the present disclosure, a texture characteristic of image content of the coding block may be extracted, and an optimal scanning manner parameter may be determined based on a texture characteristic of the image, so that coding compression efficiency of the coding block may be further improved.

As an exemplary solution, the extraction sub-module may extract the texture characteristic of the pixel samples in the coding block and/or the pixel samples in the adjacent region of the coding block by the following acts S1 and S2.

At act S1, filtering processing may be performed on the pixel samples in the coding block and/or the pixel samples in the adjacent region of the coding block.

At act S2, the texture characteristic may be extracted according to a filtering processing result.

In an exemplary embodiment, the extraction sub-module may be configured to perform the filtering processing on the pixel samples in the coding block and/or the pixel samples in the adjacent region of the coding block by the following act S12.

At act S12, edge detection filtering may be performed on the pixel samples in the coding block and/or the pixel samples in the adjacent region of the coding block.

In an exemplary embodiment, the edge detection filtering serves as one implementation means, and the embodiment has no limits on the implementation means for acquisition of the texture characteristic in the embodiment. Therefore, whether to partition the coding block into scanning regions or not may be determined according to edge information. Furthermore, the scanning order of the pixels in the scanning region may be determined according to the texture characteristic extracted from a detection result.

As an exemplary solution, the first determination sub-module may be configured to determine the scanning manner parameter of the coding block according to the texture characteristic by the following act S1.

At act S1, the region indication parameter in the scanning manner parameter may be determined according to the texture characteristic to obtain the scanning region of the coding block. In the embodiment, the scanning region of the coding block may include at least one of the following conditions: the coding block may be determined as one scanning region, and the coding block may be partitioned into multiple scanning regions.

It should be noted that, in the embodiment, the coded scanning region may be determined by, but not limited to, judging whether the texture direction indicated by the texture characteristic is intersected with the boundary of the coding block or not. For example, the coding block may be partitioned into multiple scanning regions in the direction perpendicular to the boundary when the texture direction is intersected with the boundary of the coding block. Here, the partitioning directions of the multiple scanning regions may alternatively be determined according to, but not limited to, the texture characteristic (i.e. texture direction) of the image content in the coding block, for example, the multiple scanning regions may be consistent with the texture direction.

According to the embodiment provided by the present disclosure, the region indication parameter in the scanning manner parameter may be determined to implement split scanning of the coding block according to the texture characteristic, thereby ensuring that split scanning may be simultaneously performed on different scanning regions in a process of performing scanning coding on the coding block and achieve the effect of improving the coding efficiency.

As an exemplary solution, the first determination sub-module may be configured to determine the region indication parameter in the scanning manner parameter according to the texture characteristic to obtain the scanning region of the coding block by the following acts S1 to S3.

At act S1, whether a texture direction indicated by the texture characteristic is intersected with a boundary of the coding block or not may be judged.

At act S2, when the texture direction is intersected with the boundary of the coding block, the coding block may be partitioned into multiple scanning regions in a horizontal or vertical direction by taking a position of an intersection of the texture direction and the boundary of the coding block as an origin; and At act S3, when the texture direction is not intersected with the boundary of the coding block, the coding block may be determined as one scanning region.

In an exemplary embodiment, the act of partitioning the coding block into the multiple scanning regions in the horizontal or vertical direction by taking the position of the intersection of the texture direction and the boundary of the coding block as the origin may include one of the following acts S22 and S24.

At act S22, when the texture direction is intersected with a horizontal boundary of the coding block, the coding block may be partitioned into multiple scanning regions in the vertical direction perpendicular to the horizontal boundary by taking a position of an intersection of the texture direction and the boundary of the coding block as an origin.

At act S24, when the texture direction is intersected with a vertical boundary of the coding block, the coding block may be partitioned into multiple scanning regions in the horizontal direction perpendicular to the vertical boundary by taking a position of an intersection of the texture direction and the boundary of the coding block as an origin.

It should be noted that, in the embodiment, for simplifying operations, split scanning may be performed on the coding block in, but not limited to, the horizontal or vertical direction. In addition, in the embodiment, the multiple scanning regions may also be determined according to, but not limited to, a practical texture direction of the image content in the coding block. That is, multiple parallel scanning regions may be partitioned in a direction consistent with the texture direction.

According to the embodiment provided by the present disclosure, the scanning region may be determined based on the judgment about whether the texture direction indicated by the texture characteristic is intersected with the boundary of the coding block or not. Not only may convenience for operation be ensured, but also the compression efficiency of the coding block may be further ensured.

As an exemplary solution, the first determination sub-module may be configured to determine the scanning manner parameter of the coding block according to the texture characteristic by the following act S1.

At act S1, the scanning indication parameter in the scanning manner parameter may be set according to a texture direction indicated by the texture characteristic. The scanning indication parameter may indicate the scanning order of the pixels in the scanning region of the coding block.

In an exemplary embodiment, during multi-split scanning, different scanning regions may, but not limited to, adopt the same scanning order, and may alternatively adopt different mixed scanning orders. For example, FIG. 4 to FIG. 9 are schematic diagrams of multiple kinds of mixed scanning obtained by combining different scanning manners and different scanning orders.

According to the embodiment provided by the present disclosure, the scanning order of the pixels in the one or more scanning regions in the coding block may be set according to the texture direction, so that the scanning coding operations may be further simplified, and the coding efficiency may be ensured.

As an exemplary solution, the first determination module may include an acquisition sub-module, a comparison sub-module and a second determination sub-module.

1) The acquisition sub-module may be configured to acquire correlation of the pixel samples in the scanning region of the coding block. The correlation may include at least one of: row correlation and column correlation.

2) The comparison sub-module may be configured to compare the correlation of the pixel samples.

3) The second determination sub-module may be configured to determine the scanning order of the pixels in the scanning region of the coding block according to a comparison result.

In an exemplary embodiment, the comparison sub-module may be configured to determine the scanning order of the pixels in the scanning region of the coding block according to the comparison result by the following act S1.

At act S1, a scanning order indicated by a maximum correlation in the comparison result may be set as the scanning order of the pixels in the scanning region.

It should be noted that the scanning order of the pixels in the scanning region may be determined according to, but not limited to, the maximum correlation in the row correlation and/or column correlation of the pixels in the scanning region. Here, the embodiment has no limits on an acquisition manner for the correlation in the embodiment.

According to the embodiment provided by the present disclosure, corresponding scanning order may be set for the scanning region, thereby implementing adoption of diversified scanning orders for the coding block to ensure maximization of the coding efficiency.

As an exemplary solution, the second determination unit may include a second determination module and a third determination module.

1) The second determination module may be configured to determine reference values of the pixel samples of part or all of the pixels in the coding block, and determine the reference values as the predicted values.

2) The third determination module may be configured to determine combinations of the pixel samples of part or all of the pixels in the coding block according to the scanning manner parameter, and determine combinations of the reference values corresponding to the combinations of the pixel samples as the predicted values.

In an exemplary embodiment, the combinations of the pixel samples may include, but not limited to, multiple combinations, formed by different scanning regions, of the pixel samples. The reference values may also be called as reference samples.

It should be noted that, in the embodiment, coding the coding block may refer to performing compressed coding on the original sampling values (also called as the pixel values in the embodiment) of the pixels in the coding block, that is, the original sampling values (i.e. the pixel values) of the pixels in the coding block may be mapped (destructively) into a series of parameters, and these parameters indicate the prediction method adopted for the coding block, the construction method for the predicted values and the predicted differences. In the embodiment of the present disclosure, since the split scanning manner may be adopted to perform coding scanning on the coding block, it may be suggested to code the information identifying the split scanning manner used for the coding block, i.e. the scanning manner parameter, in the bitstream.

That is, the two-dimensional pixels in the coding block may be partitioned into some columns of strings formed by the pixels continuously arranged according to the scanning order according to the scanning manner parameter, and these strings may be continuously arranged into the two-dimensional pixel arrangement in the coding block according to the scanning order. Each string has its own matched string (i.e. predicted value), and the matched string of each string may be continuously arranged into the predicted values of the two-dimensional pixels in the coding block according to the scanning order. The act of writing into the bitstream may be implemented in the following manner. A reference numerical value represented by an ordinary decimal numeral system may be converted into a binary symbol string represented by bits 0 and 1, the binary symbol string may be directly used as a bitstream, the binary symbol string may alternatively be mapped into another new binary symbol string by virtue of, for example, an arithmetic entropy coding method, and the new binary symbol string may be determined as the bitstream. The embodiment has no limits for the specific manner adopted.

According to the embodiment provided by the present disclosure, at the same time when split scanning is performed on the coding block, split coding may be performed on the coding block according to split contents, thereby further achieving the effect of improving the compression efficiency in the coding process.

As an exemplary solution, the coding unit may include a coding module.

1) The coding module may be configured to write the coding result and the scanning manner parameter into one or more data units in the bitstream according to a predetermined format. The data units may include at least one of: a video parameter set, a sequence parameter set, a picture parameter set, a slice header, a CTU, a CU and a data unit where the coding block is located.

It should be noted that coding may be configured in, but not limited to, at least one of the following manners: configuration with a coder, configuration according to a setting of a coder optimization module and direct configuration in the coder optimization module with a fixed pre-coding manner. The coder may adopt a method as follows. When a split scanning manner of vertical splitting is used for an upper adjacent block and a vertical edge of the upper adjacent block is intersected with a lower boundary of the upper adjacent block, it may be directly deduced that the current block adopts the same split scanning manner with the upper adjacent block, that is, a precoding process for the current coding block is eliminated, so that coding time may be saved, and the coding efficiency may be improved.

It should be noted that each module may be implemented through software or hardware, and under the latter condition, may be implemented in, but not limited to, the following manner. The modules may be positioned in the same processor, or the modules may be positioned in multiple processors respectively.

Fourth Embodiment

The embodiment provides an image decoding apparatus. The apparatus may be configured to implement the above-mentioned embodiment and preferred implementation modes, and what has been described will not be elaborated. For example, term "module", used below, may be a combination of software and/or hardware capable of realizing a preset function. Although the apparatus described in the following embodiment is preferably implemented with software, implementation with hardware or a combination of the software and the hardware is also possible and conceivable.

Figure 12:
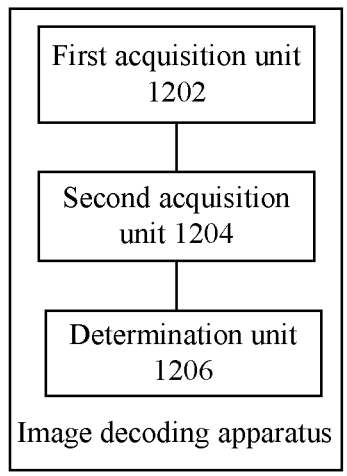
FIG. 12 is a schematic diagram of an exemplary image decoding apparatus according to an embodiment of the present disclosure.

The embodiment provides an image decoding apparatus. FIG. 12 is a schematic diagram of an exemplary image decoding apparatus according to an embodiment of the present disclosure. As shown in FIG. 12, the apparatus may include a first acquisition unit 1202, a second acquisition unit 1204 and a determination unit 1206.

1) The first acquisition unit 1202 may be configured to parse a bitstream to acquire a decoding parameter of a decoding block.

2) The second acquisition unit 1204 may be configured to acquire a scanning manner parameter according to the decoding parameter. The scanning manner parameter may include: a region indication parameter used for determining a scanning region of the decoding block, and/or a scanning indication parameter used for determining a scanning order of pixels in a scanning region.

3) The determination unit 1206 may be configured to determine reconstructed values of part or all of pixels in the decoding block according to the region indication parameter and/or the scanning indication parameter.

In an exemplary embodiment, the image decoding apparatus may be applied to, but not limited to, a video image decoding process, and for example, may be applied to, but not limited to, a packed-format image decoding or component planar-format image decoding process. In a process of decoding a video image, split scanning may be performed on a decoding block to be decoded according to an indication of a determined scanning manner parameter. That is, the decoding block may be split into K scanning regions for scanning according to a corresponding scanning order, so as to solve a problem of lower efficiency caused by adoption of a fixed scanning manner for row (or column) scanning and further achieve an effect of improving decompression efficiency in the image decoding process. In some embodiments, K may meet the following condition: 1<K<16. K=1 represents 1-split, i.e. non-split or called as single-split. K>1 represents multi-split, i.e. split scanning.

It should be noted that, when the decoding block to be decoded is decoded in the embodiment, the bitstream may be parsed to acquire the decoding parameter of the decoding block to be decoded, and the scanning manner parameter of the decoding block may be determined according to the decoding parameter. The scanning manner parameter may include the region indication parameter used for determining the scanning region of the decoding block and/or the scanning indication parameter used for determining the scanning order of the pixels in the scanning region. The reconstructed values of part or all of the pixels in the decoding block may be determined according to the scanning manner parameter and/or the scanning indication parameter. That is, scanning coding may be performed on the decoding block by adopting a split scanning manner, thereby partitioning the decoding block into smaller scanning regions to achieve the effect of improving decoding efficiency.

In the embodiment, it should be noted that "pixel sample", "pixel value", "sample", "indexed pixel" and "pixel index" are synonyms, and whether these terms represent a "pixel" or "a pixel component" or an "indexed pixel", or represent any one of the three should be clear to a skilled in the art based on the context. If this information cannot be clearly determined based on the context, any one of the three is represented.

In addition, the decoding block may be a region formed by a plurality of pixel values. A shape of the decoding block may include, but not limited to, at least one of the following shapes: a rectangle, a square, a parallelogram, a trapezoid, a polygon, a round, an ellipse or any other shape. Herein, the rectangle may also include a rectangle of which a width or height is one pixel, that is, a rectangle which is degenerated into a line (i.e. a line segment or a line shape). In the embodiment, in one image, each decoding block may have a different shape and size. In addition, in one image, some or all of decoding blocks may have mutually overlapped parts, or none of the decoding blocks may be overlapped. Furthermore, a decoding block may be formed by "pixels", or by "components of the pixels", or by "indexed pixels", or by mixture of the three, and may alternatively be formed by mixture of any two of the three, which will not be limited in the embodiment. From the point of video image decoding, a decoding block may refer to a region which is decoded in an image, for example, including, but not limited to, at least one of: an LCU, a CTU, a decoding unit, a sub-region of the decoding unit, a PU or a TU.

In an exemplary embodiment, the scanning order of the pixels in the scanning region may include at least one of: a horizontal Z-shaped scanning order, a vertical Z-shaped scanning order, a horizontal arched scanning order, a vertical arched scanning order, a raster scanning order, a Zigzag scanning order, a saw-toothed scanning order, a diagonal Z-shaped scanning order and a diagonal arched scanning order.

In an exemplary embodiment, a scanning manner may include, but not limited to, at least one of: 2-split, 4-split, 8-split and 16-split. In a multi-split process, scanning orders of different scanning regions may be the same, or may be different, which will not be limited in the embodiment.

For example, FIG. 3 shows four kinds of optional scanning indicated by the scanning manner parameter: 1) horizontal Z-shaped 2-split scanning is performed on the decoding block; 2) horizontal Z-shaped 4-split scanning is performed on the decoding block; 3) vertical Z-shaped 2-split scanning is performed on the decoding block; and 4) vertical Z-shaped 4-split scanning is performed on the decoding block. For another example, FIG. 4 to FIG. 9 show multiple kinds of optional scanning obtained by combining different scanning manners and different scanning orders and indicated by the scanning manner parameter.

In an exemplary embodiment, a manner of acquiring the scanning manner parameter according to the decoding parameter may include at least one of:

1) acquiring the region indication parameter and/or scanning indication parameter in the scanning manner parameter from the decoding parameter;

2) extracting a characteristic parameter of pixel samples in an adjacent region of the decoding block, where the characteristic parameter includes a texture characteristic, and determining the scanning manner parameter of the decoding block according to the texture characteristic; and 3) acquiring a mode indication parameter used for indicating a coding mode according to the decoding parameter, and acquiring the scanning manner parameter from the mode indication parameter.

It should be noted that a manner of, after the bitstream is parsed to acquire the decoding parameter directly coded in the bitstream, the act of acquiring the scanning manner parameter according to the decoding parameter may include at least one of: (1) parsing the bitstream to directly obtain the region indication parameter and/or scanning indication parameter in the scanning manner parameter; (2) obtaining the region indication parameter and/or scanning indication parameter in the scanning manner parameter in a deduction manner according to the characteristic parameter of the pixel samples in the adjacent region of the decoding block; and (3) adopting a "fixed binding" form for the scanning manner and some coding modes, namely acquiring the mode indication parameter used for indicating the coding mode according to the decoding parameter, and when a mode marker is parsed from the mode indication parameter, using a region indication parameter and/or scanning indication parameter preset for the mode.

In addition, in the embodiment, a pixel may indicate a minimum display unit of an image, and there may be one (such as monochromic grayscale image) or three (such as RGB and YUV) effective sampling values, i.e. pixel samples, at one pixel position. In the embodiment, pixels may be used to describe positions, and pixel samples may be used to describe and process sampling values at pixel positions.

Furthermore, in the manner 2), the decoded scanning region may be determined by, but not limited to, judging whether a texture direction indicated by the texture characteristic is intersected with a boundary of the decoding block or not. For example, the decoding block may be partitioned into multiple scanning regions in a direction perpendicular to the boundary when the texture direction is intersected with the boundary of the coding block.

In an exemplary embodiment, a manner of determining the reconstructed values of part or all of the pixels in the decoding block according to the region indication parameter and/or the scanning indication parameter may include one of the following acts.

1) Predicted values of part or all of the pixels in the decoding block may be acquired, and the predicted values may be determined as the reconstructed values.

2) Predicted values and corresponding predicted difference values of part or all of the pixels in the decoding block may be acquired, and sum values or difference values between the predicted values and the predicted difference values may be determined as the reconstructed values.

In an exemplary embodiment, the act of determining the predicted values of part or all of the pixels in the decoding block may include the following acts. Reference values of the pixel samples of part or all of the pixels in the decoding block may be determined as the predicted values. Combinations of the pixel samples of part or all of the pixels in the decoding block may be determined according to the scanning manner parameter, and combinations of the reference values corresponding to the combinations of the pixel samples may be determined as the predicted values.

In an exemplary embodiment, the act of parsing the bitstream to acquire the decoding parameter of the decoding block may include an act of acquiring the decoding parameter from one or more data units in the bitstream. The data units may include at least one of: a video parameter set, a sequence parameter set, a picture parameter set, a slice header, a CTU, a CU and a data unit where the decoding block is located.

Descriptions will specifically be made in combination with the following example. For a bitstream obtained by coding a coding block adopting string matching coding, a decoding block may be partitioned into different scanning regions in a decoding process, and split scanning corresponding to a coding process may be used for each scanning region. For example, if elements in a two-dimensional matrix are arranged into a one-dimensional vector in the coding process according to an indication of the scanning manner parameter, the decoding process may be considered as an inverse process of coding, that is, elements in a one-dimensional vector may be arranged into a two-dimensional matrix. A read-write address control method may be adopted for practical code implementation. For example, two-dimensional pixels are as follows:

[ABCD
EFGH
IJKL
MNOP].

Then, the two-dimensional pixels may be converted into one-dimensional arrangement [ABCDHGFEIJKLPONM] according to "arched 4-split scanning" indicated by the scanning manner parameter corresponding to the scanning manner parameter used for the coding process. A pseudo code for implementation may be as follows:

```
int position[4][4]={0, 1, 2, 3
7, 6, 5, 4,
8, 9, 10, 11,
15, 14, 13, 12};
for (h=0; h<4; h++)
for (w=0; w<4; w++)
1D_array[position[h][w]]=2D_array[h][w].
```

According to the embodiment provided by the present disclosure, the bitstream may be parsed to acquire the decoding parameter of the decoding block, and the scanning manner parameter may be acquired according to the decoding parameter. The scanning manner parameter may include the region indication parameter used for determining the scanning region of the decoding block and/or the scanning indication parameter used for determining the scanning order of the pixels in the scanning region. The reconstructed values of part or all of the pixels in the decoding block may be determined according to the region indication parameter and/or the scanning indication parameter. That is, scanning decoding may be performed on the decoding block by adopting the split scanning manner, thereby partitioning the decoding block into smaller scanning regions to achieve the effect of improving the decoding efficiency and further solve a problem of lower efficiency caused by scanning only in the fixed manner in a decoding technology.

As an exemplary solution, the second acquisition unit may include a first acquisition module.

1) The first acquisition module may be configured to acquire the region indication parameter and/or scanning indication parameter in the scanning manner parameter from the decoding parameter to obtain the scanning region of the decoding block. The scanning region of the decoding block may include at least one of the following conditions: the decoding block is determined as one scanning region, and the decoding block is partitioned into multiple scanning regions.

In an exemplary embodiment, the decoding block may be determined as a single-split scanning region, and the decoding block may alternatively be partitioned into multi-split scanning regions.

It should be noted that, in the embodiment, the decoded scanning region may be determined by, but not limited to, judging whether the texture direction indicated by the texture characteristic in the characteristic parameter of the pixel samples in the adjacent region of the decoding block is intersected with the boundary of the decoding block or not. For example, the decoding block may be partitioned into multiple scanning regions in the direction perpendicular to the boundary when the texture direction is intersected with the boundary of the decoding block. Here, the partitioning directions of the multiple scanning regions may alternatively be determined according to, but not limited to, the texture characteristic (i.e. texture direction) of image content in the decoding block, for example, the multiple scanning regions may be consistent with the texture direction.

In an exemplary embodiment, the decoding scanning order in the decoding process may be a preset scanning order, and may also be the scanning order indicated by the scanning manner parameter. The embodiment has no limits for the specific manner adopted.

According to the embodiment provided by the present disclosure, split scanning may be performed on the decoding block according to the texture characteristic, thereby ensuring that split scanning may be simultaneously performed on different scanning regions in a process of performing scanning decoding on the decoding block and achieve the effect of improving the decoding efficiency. In addition, corresponding scanning order may be set for the scanning region, thereby implementing adoption of diversified scanning orders for the decoding block to ensure maximization of the decoding efficiency.

As an exemplary solution, the second acquisition unit may include an extraction module and a first determination module.

1) The extraction module may be configured to extract a characteristic parameter of pixel samples in an adjacent region of the decoding block. In the embodiment, the characteristic parameter may include a texture characteristic.

2) The first determination module may be configured to determine the scanning manner parameter of the decoding block according to the texture characteristic.

According to the embodiment provided by the present disclosure, a texture characteristic of the image content of the coding block may be extracted, and an optimal scanning manner parameter may be determined based on a texture characteristic of the image, so that decoding decompression efficiency of the decoding block is further improved.

As an exemplary solution, the extraction module may include a filtering sub-module and an extraction sub-module.

1) The filtering sub-module may be configured to perform filtering processing on reconstructed values of decoded pixels in the adjacent region of the decoding block.

2) The extraction sub-module may be configured to extract the texture characteristic according to a filtering processing result.

In an exemplary embodiment, the filtering sub-module may be configured to perform the filtering processing on the reconstructed values of the decoded pixels in the adjacent region of the decoding block by the following act S1.

S1, edge detection filtering may be performed on the reconstructed values of the decoded pixels in the adjacent region of the decoding block.

In an exemplary embodiment, the edge detection filtering serves as one implementation means, and the embodiment has no limits on the implementation means for acquisition of the texture characteristic in the embodiment. Therefore, whether to partition the decoding block into scanning regions or not may be determined according to edge information. Furthermore, the scanning order of the pixels in the scanning region may be determined according to the texture characteristic extracted from a detection result.

As an exemplary solution, the first determination module may include a judgment sub-module, a first partitioning sub-module and a second partitioning sub-module.

1) The judgment sub-module may be configured to judge whether a texture direction indicated by the texture characteristic is intersected with a boundary of the decoding block or not.

2) The first partitioning sub-module may be configured to, when the texture direction is intersected with the boundary of the decoding block, partition the decoding block into multiple scanning regions in a horizontal or vertical direction by taking a position of an intersection of the texture direction and the boundary of the coding block as an origin.

3) The second partitioning sub-module may be configured to, when the texture direction is not intersected with the boundary of the decoding block, determine the decoding block as one scanning region.

In an exemplary embodiment, the first partitioning sub-module may be configured to partition the decoding block into the multiple scanning regions in the horizontal or vertical direction by taking the position of the intersection of the texture direction and the boundary of the decoding block as the origin by one of the following acts S1 and S2.

At act S1, when the texture direction is intersected with a horizontal boundary of the decoding block, the decoding block may be partitioned into multiple scanning regions in the vertical direction perpendicular to the horizontal boundary by taking a position of an intersection of the texture direction and the boundary of the decoding block as an origin.

At act S2, when the texture direction is intersected with a vertical boundary of the decoding block, the decoding block may be partitioned into multiple scanning regions in the horizontal direction perpendicular to the vertical boundary by taking a position of an intersection of the texture direction and the boundary of the decoding block as an origin.

It should be noted that, in the embodiment, for simplifying operations, split scanning may be performed on the decoding block in, but not limited to, the horizontal or vertical direction. In addition, in the embodiment, the multiple scanning regions may also be determined according to, but not limited to, a practical texture direction of the image content in the decoding block. That is, multiple parallel scanning regions may be partitioned in a direction consistent with the texture direction.

According to the embodiment provided by the present disclosure, the scanning region may be determined based on the judgment about whether the texture direction indicated by the texture characteristic is intersected with the boundary of the decoding block or not. Not only may convenience for operation be ensured, but also the decompression efficiency of the decoding block is further ensured.

As an exemplary solution, the first determination module may include a setting sub-module.

1) The setting sub-module may be configured to set the scanning order of the pixels in the scanning region of the decoding block according to a texture direction indicated by the texture characteristic.

In an exemplary embodiment, during multi-split scanning, different scanning regions may, but not limited to, adopt the same scanning order, and may alternatively adopt different mixed scanning orders. For example, FIG. 4 to FIG. 9 are schematic diagrams of multiple kinds of mixed scanning obtained by combining different scanning manners and different scanning orders.

According to the embodiment provided by the present disclosure, the scanning order of the pixels in the one or more scanning regions in the decoding block is set according to the texture direction, so that the scanning decoding operations may be further simplified, and the decoding efficiency may be ensured.

As an exemplary solution, the second acquisition unit may include a second acquisition module and a third acquisition module.

1) The second acquisition module may be configured to acquire a mode indication parameter used for indicating a coding mode according to the decoding parameter.

2) The third acquisition module may be configured to acquire the scanning manner parameter from the mode indication parameter.

In an exemplary embodiment, a "fixed binding" form may be adopted for the scanning manner and some coding modes, that is, the mode indication parameter used for indicating the coding mode may be acquired according to the decoding parameter, and the mode marker may be parsed from the mode indication parameter by using the region indication parameter and/or scanning indication parameter preset for the mode.

As an exemplary solution, the determination unit may include a fourth acquisition module or a fifth acquisition module.

1) The fourth acquisition module may be configured to acquire predicted values of part or all of the pixels in the decoding block, and determine the predicted values as the reconstructed values.

2) The fifth acquisition module may be configured to acquire predicted values and corresponding predicted difference values of part or all of the pixels in the decoding block, and determine sum values or difference values between the predicted values and the predicted difference values as the reconstructed values.

In an exemplary embodiment, the combinations of the pixel samples may include, but not limited to, multiple combinations, formed by different scanning regions, of the pixel samples. The reference values may also be called as reference samples.

In an exemplary embodiment, the fourth acquisition module may include a first determination sub-module and a second determination sub-module.

(1) The first determination sub-module may be configured to determine reference values of pixel samples of part or all of the pixels in the decoding block, and determine the reference values as the predicted values.

(2) The second determination sub-module may be configured to determine combinations of the pixel samples of part or all of the pixels in the decoding block according to the scanning manner parameter, and determine combinations of the reference values corresponding to the combinations of the samples as the predicted values.

That is, the decoding process may be, but not limited to the inverse process of the coding process. For example, in a process of determining the reconstructed values, the bitstream may be parsed to obtain the predicted differences (there may be no predicted differences transmitted in the bitstream, and in this situation, the predicted differences are considered to be 0), and the reconstructed values may be equal to the sums of the predicted values and the predicted differences.

It should be noted that a destructive coding manner may be adopted in the embodiment, so that the predicted differences may be, but not limited to, directly acquired after being parsed from the bitstream, to ensure accuracy of the reconstructed values.

According to the embodiment provided by the present disclosure, at the same time when split scanning is performed on the decoding block, split decoding may be performed on the decoding block according to split contents, thereby further achieving the effect of improving the decompression efficiency in the decoding process.

As an exemplary solution, the first acquisition unit may include a decoding module.

1) The decoding module may be configured to acquire the decoding parameter from one or more data units in the bitstream. The data units may include at least one of: a video parameter set, a sequence parameter set, a picture parameter set, a slice header, a CTU, a CU and a data unit where the decoding block is located.

It should be noted that decoding may be configured in, but not limited to, at least one of the following manners: configuration with a decoder, configuration according to a setting of a decoder optimization module and direct configuration in the decoder optimization module with a fixed precoding manner. The decoder may adopt a method as follows. When a split scanning manner of vertical splitting is used for an upper adjacent block and a vertical edge of the upper adjacent block is intersected with a lower boundary of the upper adjacent block, it may be directly deduced that the current block adopts the same split scanning manner with the upper adjacent block, that is, a pre-decoding process for the current decoding block is eliminated, so that decoding time may be saved, and the decoding efficiency may be improved.

It should be noted that each module may be implemented through software or hardware, and under the latter condition, may be implemented in, but not limited to, the following manner. The modules may be positioned in the same processor, or the modules may be positioned in multiple processors respectively.

Fifth Embodiment

The embodiment of the present disclosure provides a storage medium. In an exemplary embodiment, the storage medium may be configured to store program codes configured to execute the following acts S1 to S3.

At act S1, a scanning manner parameter of a coding block may be determined. The scanning manner parameter may include at least one of: a region indication parameter used for determining a scanning region of the coding block and a scanning indication parameter used for determining a scanning order of pixels in a scanning region of the coding block.

At act S2, predicted values of part or all of pixels in the coding block may be determined according to the scanning manner parameter.

At act S3, the coding block may be coded according to the predicted values, and a coding result may be written into a bitstream.

The embodiment of the present disclosure provides a storage medium. In an exemplary embodiment, the storage medium may be configured to store program codes configured to execute the following acts S1 to S3.

At act S1, a bitstream may be parsed to acquire a decoding parameter of a decoding block.

At act S2, a scanning manner parameter may be acquired according to the decoding parameter. The scanning manner parameter may include: a region indication parameter used for determining a scanning region of the decoding block, and/or a scanning indication parameter used for determining a scanning order of pixels in a scanning region.

At act S3, reconstructed values of part or all of pixels in the decoding block may be determined according to the region indication parameter and/or the scanning indication parameter.

In an exemplary embodiment, the storage medium may include, but not limited to: various media capable of storing program codes such as a U disk, a ROM, a RAM, a mobile hard disk, a magnetic disk or an optical disk.

In an exemplary embodiment, specific examples in the embodiment may refer to examples described in the above-mentioned embodiments and optional implementation modes, and will not be elaborated in the embodiment.

Obviously, those skilled in the art should know that each module or each step of the present disclosure may be implemented by a universal computing apparatus, and the modules or acts may be concentrated on a single computing apparatus or distributed on a network formed by multiple computing devices, and may optionally be implemented by program codes executable for the computing devices, so that the modules or acts may be stored in a storage device for execution with the computing devices, the shown or described acts may be executed in sequences different from those shown or described here in some circumstances, or may form each integrated circuit module respectively, or multiple modules or acts therein may form a single integrated circuit module for implementation. As a consequence, the present disclosure is not limited to any specific hardware and software combination.

The above is only the preferred embodiment of the present disclosure and not intended to limit the present disclosure. For those skilled in the art, the present disclosure may have various modifications and variations. Any modifications, equivalent replacements, improvements and the like made within the principle of the present disclosure shall fall within the scope of protection defined by the appended claims of the present disclosure.

INDUSTRIAL APPLICABILITY

In an image coding and/or decoding process of the embodiments of the present disclosure, scanning coding/decoding may be performed on the coding/decoding block by adopting a split scanning manner, thereby partitioning the coding/decoding block into smaller scanning regions to achieve an effect of improving coding compression efficiency and decoding decompression efficiency and further solve a problem of lower efficiency caused by scanning only in a fixed manner in a coding technology.

What is claimed is:

1. An image coding method, comprising:
    determining a scanning manner parameter of a coding block, wherein the scanning manner parameter comprises: a region indication parameter used for indicating the coding block is partitioned into multiple scanning regions and a scanning indication parameter used for determining a scanning order of pixels in a scanning region of the multiple scanning regions of the coding block, wherein the scanning order, indicated by the scanning indication parameter, of the pixels in the scanning region of the multiple scanning regions of the coding block comprises a horizontal Z-shaped scanning order;
    determining predicted values of part or all of pixels in the coding block according to the scanning manner parameter; and
    coding the coding block according to the predicted values, and writing a coding result into a bitstream.

2. The method as claimed in claim 1, wherein determining predicted values of part or all of pixels in the coding block according to the scanning manner parameter, and coding the coding block according to the predicted values, comprises:
    performing scanning coding on the coding block by adopting a split scanning manner indicated by the scanning manner parameter to obtain the coding result.

3. The method as claimed in claim 2, wherein the region indication parameter indicates that the coding block is partitioned into 2 scanning regions, the split scanning manner indicated by the scanning manner parameter is 2-split;
    the performing scanning coding on the coding block by adopting a split scanning manner indicated by the scanning manner parameter, comprises: performing horizontal Z-shaped 2-split scanning on the coding block to obtain the coding result.

4. The method as claimed in claim 2, wherein the region indication parameter indicates that the coding block is partitioned into 4 scanning regions, the split scanning manner indicated by the scanning manner parameter is 4-split;
    the performing scanning coding on the coding block by adopting a split scanning manner indicated by the scanning manner parameter, comprises: performing horizontal Z-shaped 4-split scanning on the coding block to obtain the coding result.

5. The method as claimed in claim 1, wherein determining the scanning manner parameter of the coding block comprises:
    extracting a characteristic parameter of pixel samples in the coding block and/or pixel samples in an adjacent region of the coding block; and
    determining the scanning manner parameter of the coding block according to the characteristic parameter;
    wherein extracting the characteristic parameter of the pixel samples in the coding block and/or the pixel samples in the adjacent region of the coding block comprises: extracting a texture characteristic of the pixel samples in the coding block and/or the pixel samples in the adjacent region of the coding block, wherein the characteristic parameter comprises the texture characteristic; and
    determining the scanning manner parameter of the coding block according to the characteristic parameter comprises: determining the scanning manner parameter of the coding block according to the texture characteristic;

wherein extracting the texture characteristic of the pixel samples in the coding block and/or the pixel samples in the adjacent region of the coding block comprises:
performing filtering processing on the pixel samples in the coding block and/or the pixel samples in the adjacent region of the coding block; and
extracting the texture characteristic according to a filtering processing result;
wherein performing the filtering processing on the pixel samples in the coding block and/or the pixel samples in the adjacent region of the coding block comprises:
performing edge detection filtering on the pixel samples in the coding block and/or the pixel samples in the adjacent region of the coding block.

6. The method as claimed in claim 5, wherein determining the scanning manner parameter of the coding block according to the texture characteristic comprises:
determining the region indication parameter in the scanning manner parameter according to the texture characteristic to obtain the multiple scanning regions of the coding block,
wherein determining the region indication parameter in the scanning manner parameter according to the texture characteristic to obtain the multiple scanning regions of the coding block comprises:
judging whether a texture direction indicated by the texture characteristic is intersected with a boundary of the coding block or not;
when the texture direction is intersected with the boundary of the coding block, partitioning the coding block into multiple scanning regions in a horizontal or vertical direction by taking a position of an intersection of the texture direction and the boundary of the coding block as an origin, wherein partitioning the coding block into the multiple scanning regions in the horizontal or vertical direction by taking the position of the intersection of the texture direction and the boundary of the coding block as the origin comprises: when the texture direction is intersected with a horizontal boundary of the coding block, partitioning the coding block into multiple scanning regions in the vertical direction perpendicular to the horizontal boundary by taking a position of an intersection of the texture direction and the boundary of the coding block as an origin; or when the texture direction is intersected with a vertical boundary of the coding block, partitioning the coding block into multiple scanning regions in the horizontal direction perpendicular to the vertical boundary by taking a position of an intersection of the texture direction and the boundary of the coding block as an origin.

7. The method as claimed in claim 5, wherein determining the scanning manner parameter of the coding block according to the texture characteristic comprises:
setting the scanning indication parameter in the scanning manner parameter according to a texture direction indicated by the texture characteristic, wherein the scanning indication parameter indicates the scanning order of the pixels in the the scanning region of the multiple scanning regions of the coding block.

8. The method as claimed in claim 5, wherein determining the scanning manner parameter of the coding block according to the characteristic parameter comprises:
acquiring correlation of the pixel samples in the scanning region of the coding block, wherein the correlation comprises at least one of: row correlation and column correlation;
comparing the correlation of the pixel samples; and
determining the scanning order of the pixels in the scanning region of the coding block according to a comparison result, wherein determining the scanning order of the pixels in the scanning region of the coding block according to the comparison result comprises: setting a scanning order indicated by a maximum correlation in the comparison result as the scanning order of the pixels in the scanning region.

9. The method as claimed in claim 1, wherein determining the predicted values of part or all of the pixels in the coding block according to the scanning manner parameter comprises:
determining reference values of the pixel samples of part or all of the pixels in the coding block, and determining the reference values as the predicted values; and
determining combinations of the pixel samples of part or all of the pixels in the coding block according to the scanning manner parameter, and determining combinations of the reference values corresponding to the combinations of the pixel samples as the predicted values.

10. An image decoding method, comprising:
parsing a bitstream to acquire a decoding parameter of a decoding block;
acquiring a scanning manner parameter according to the decoding parameter, wherein the scanning manner parameter comprises: a region indication parameter used for indicating the decoding block is partitioned into multiple scanning regions, and a scanning indication parameter used for determining a scanning order of pixels in a scanning region of the multiple scanning regions of the decoding block, wherein the scanning order, indicated by the scanning indication parameter, of the pixels in the scanning region of the multiple scanning regions of the decoding block comprises a horizontal Z-shaped scanning order; and
determining reconstructed values of part or all of pixels in the decoding block according to the region indication parameter and the scanning indication parameter.

11. The method as claimed in claim 10, wherein determining reconstructed values of part or all of pixels in the decoding block according to the region indication parameter and the scanning indication parameter, comprises:
performing scanning decoding on the decoding block by adopting a split scanning manner indicated by the scanning manner parameter to determine the reconstructed values of part or all of pixels in the decoding block.

12. The method as claimed in claim 11, wherein the region indication parameter indicates that the decoding block is partitioned into 2 scanning regions, the split scanning manner indicated by the scanning manner parameter is 2-split;
the performing scanning decoding on the decoding block by adopting a split scanning manner indicated by the scanning manner parameter, comprises: performing horizontal Z-shaped 2-split scanning on the decoding block.

13. The method as claimed in claim 11, wherein the region indication parameter indicates that the decoding block is partitioned into 4 scanning regions, the split scanning manner indicated by the scanning manner parameter is 4-split;
the performing scanning decoding on the decoding block by adopting a split scanning manner indicated by the scanning manner parameter, comprises: performing horizontal Z-shaped 4-split scanning on the decoding block.

14. The method as claimed in claim 10, wherein acquiring the scanning manner parameter according to the decoding parameter comprises:
 acquiring the region indication parameter and scanning indication parameter in the scanning manner parameter from the decoding parameter to obtain the multiple scanning regions of the decoding block.

15. The method as claimed in claim 10, wherein acquiring the scanning manner parameter according to the decoding parameter comprises:
 extracting a characteristic parameter of pixel samples in an adjacent region of the decoding block, wherein the characteristic parameter comprises a texture characteristic; and
 determining the scanning manner parameter of the decoding block according to the texture characteristic;
 wherein extracting the characteristic parameter of the adjacent region of the decoding block comprises:
 performing filtering processing on reconstructed values of decoded pixels in the adjacent region of the decoding block, wherein performing the filtering processing on the reconstructed values of the decoded pixels in the adjacent region of the decoding block comprises: performing edge detection filtering on the reconstructed values of the decoded pixels in the adjacent region of the decoding block; and
 extracting the texture characteristic according to a filtering processing result.

16. The method as claimed in claim 15, wherein determining the scanning manner parameter of the decoding block according to the texture characteristic comprises:
 judging whether a texture direction indicated by the texture characteristic is intersected with a boundary of the decoding block or not; when the texture direction is intersected with the boundary of the decoding block, partitioning the decoding block into multiple scanning regions in a horizontal or vertical direction by taking a position of an intersection of the texture direction and the boundary of the coding block as an origin;
 or,
 setting the scanning order of the pixels in the scanning region of the decoding block according to a texture direction indicated by the texture characteristic.

17. The method as claimed in claim 10, wherein acquiring the scanning manner parameter according to the decoding parameter comprises:
 acquiring a mode indication parameter used for indicating a coding mode according to the decoding parameter; and
 acquiring the scanning manner parameter from the mode indication parameter.

18. The method as claimed in claim 10, wherein determining the reconstructed values of part or all of the pixels in the decoding block according to the region indication parameter and the scanning indication parameter comprises:
 acquiring predicted values of part or all of the pixels in the decoding block, and determining the predicted values as the reconstructed values; or
 acquiring predicted values and corresponding predicted difference values of part or all of the pixels in the decoding block, and determining sum values or difference values between the predicted values and the predicted difference values as the reconstructed values;
 wherein acquiring the predicted values of part or all of the pixels in the decoding block comprises:
 determining reference values of pixel samples of part or all of the pixels in the decoding block, and determining the reference values as the predicted values; and
 determining combinations of the pixel samples of part or all of the pixels in the decoding block according to the scanning manner parameter, and determining combinations of the reference values corresponding to the combinations of the samples as the predicted values.

19. An image coding apparatus, comprising a hardware processor arranged to execute program units comprising:
 a first determination unit, configured to determine a scanning manner parameter of a coding block, wherein the scanning manner parameter comprises: a region indication parameter used for indicating the coding block is partitioned into multiple scanning regions and a scanning indication parameter used for determining a scanning order of pixels in a scanning region of the multiple scanning regions of the coding block, wherein the scanning order, indicated by the scanning indication parameter, of the pixels in the scanning region of the multiple scanning regions of the coding block comprises a horizontal Z-shaped scanning order;
 a second determination unit, configured to determine predicted values of part or all of pixels in the coding block according to the scanning manner parameter; and
 a coding unit, configured to code the coding block according to the predicted values, and write a coding result into a bitstream.

20. An image decoding apparatus, comprising a hardware processor arranged to execute program units comprising:
 a first acquisition unit, configured to parse a bitstream to acquire a decoding parameter of a decoding block;
 a second acquisition unit, configured to acquire a scanning manner parameter according to the decoding parameter, wherein the scanning manner parameter comprises: a region indication parameter used for indicating the decoding block is partitioned into multiple scanning regions, and a scanning indication parameter used for determining a scanning order of pixels in a scanning region of the multiple scanning regions of the decoding block, wherein the scanning order, indicated by the scanning indication parameter, of the pixels in the scanning region of the multiple scanning regions of the decoding block comprises a horizontal Z-shaped scanning order; and
 a determination unit, configured to determine reconstructed values of part or all of pixels in the decoding block according to the region indication parameter and the scanning indication parameter.

* * * * *